US012413018B2

(12) United States Patent
Chiang et al.

(10) Patent No.: US 12,413,018 B2
(45) Date of Patent: Sep. 9, 2025

(54) ELECTRICAL CONNECTOR ASSEMBLY

(71) Applicant: Cheng Uei Precision Industry Co., LTD., New Taipei (TW)

(72) Inventors: Chih-Hsien Chiang, New Taipei (TW); Sheng-Nan Yu, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 433 days.

(21) Appl. No.: 18/120,359

(22) Filed: Mar. 10, 2023

(65) Prior Publication Data

US 2023/0402791 A1 Dec. 14, 2023

(30) Foreign Application Priority Data

Jun. 8, 2022 (CN) ........................ 202221421629.X

(51) Int. Cl.

*H01R 13/639* (2006.01)
*H01R 13/52* (2006.01)
*H01R 13/622* (2006.01)
*H01R 13/629* (2006.01)

(52) U.S. Cl.

CPC ....... *H01R 13/639* (2013.01); *H01R 13/5202* (2013.01); *H01R 13/622* (2013.01); *H01R 13/629* (2013.01)

(58) Field of Classification Search

CPC .............. H01R 13/506; H01R 13/5202; H01R 13/5208; H01R 13/622; H01R 13/625; H01R 13/6275; H01R 13/629; H01R 13/639; H01R 2107/00; H01R 24/86

See application file for complete search history.

(56) References Cited

U.S. PATENT DOCUMENTS

| | | | | |
|---|---|---|---|---|
| 4,550,966 A * | 11/1985 | Riley | H01R 13/6397 | 439/321 |
| 9,350,116 B1 * | 5/2016 | Morello | H01R 13/633 | |
| 9,608,357 B1 * | 3/2017 | Sundarakrishnamachari | H01R 13/62977 | |
| 11,695,241 B2 * | 7/2023 | Guo | H01R 12/58 | 439/55 |
| 2009/0311899 A1 * | 12/2009 | Takehara | H01R 13/5213 | 439/292 |

(Continued)

FOREIGN PATENT DOCUMENTS

WO WO-2013046671 A1 * 4/2013 ........... H01R 13/627

*Primary Examiner* — Abdullah A Riyami
*Assistant Examiner* — Thang H Nguyen
(74) *Attorney, Agent, or Firm* — Cheng-Ju Chiang

(57) ABSTRACT

An electrical connector assembly includes an electrical connector, a locking structure and a docking connector. The electrical connector includes a first main module, a plurality of first terminals fastened in the first main module, a first shell mounted around an outer surface of the first main module, and a protective tube. The protective tube is mounted around an outer surface of the first shell. An outer surface of the protective tube protrudes outward to form a mounting portion. The locking structure is disposed to the mounting portion. The docking connector is docked with the electrical connector. The docking connector includes a second main module, a plurality of second terminals fastened in the second main module, and a second shell mounted around an outer surface of the second main module.

20 Claims, 20 Drawing Sheets

(56) References Cited

U.S. PATENT DOCUMENTS

| | | | | |
|---|---|---|---|---|
| 2011/0207359 | A1* | 8/2011 | Matsumoto | H01R 13/6275 439/347 |
| 2019/0363476 | A1* | 11/2019 | Zheng | H01R 13/46 |

* cited by examiner

ELECTRICAL CONNECTOR ASSEMBLY

CROSS-REFERENCE TO RELATED APPLICATION

The present application is based on, and claims priority from, China Patent Application No. 202221421629.X, filed Jun. 8, 2022, the disclosure of which is hereby incorporated by reference herein in its entirety.

BACKGROUND OF THE INVENTION

1. Field of the Invention

The present invention generally relates to an electrical connector assembly, and more particularly to an electrical connector assembly having a double locking structure.

2. The Related Art

Generally, when a conventional electrical connector is docked with a docking connector, the conventional electrical connector is mostly combined with the docking connector by adopting a quick docking way, a push-pull way, a rotary lock way and a screw thread tightening way. However, in a docking process of the conventional electrical connector and the docking connector, the rotary lock way and the screw thread tightening way take up more space in use, and the rotary lock way and the screw thread tightening way are unable to be used in places with limited spaces. In addition, though the quick docking way and the push-pull way are convenient, when the conventional electrical connector is pulled or vibrated by an external force, the conventional electrical connector is easily loosened from the docking connector or separated from the docking connector, consequently, after the conventional electrical connector is docked with the docking connector, a connection effect between the conventional electrical connector and the docking connector is unable to be guaranteed. Furthermore, in some specific usage states, the docked conventional electrical connector and the docking connector need allow a relative rotation between the conventional electrical connector and the docking connector, in this case, if a vibration is too frequent and intense, the conventional electrical connector may cause a gradual rotation and a loosened phenomenon.

A conventional electrical connector assembly includes a first connector and a second connector. The first connector includes a first insulating core, a plurality of first terminals, a protective tube, a compression spring and a locking structure. The plurality of the first terminals are fastened in the first insulating core. An inner surface of the protective tube has a blocking block. The protective tube is mounted around an outside of the first insulating core. The compression spring is arranged between the first insulating core and the protective tube. The first insulating core and the protective tube are combined by the locking structure. The locking structure includes an avoiding groove, a convex block, a sliding groove and a stopping block. The stopping block passes through the avoiding groove. After the protective tube is rotated, the stopping block passes across the convex block and then enters the sliding groove. The stopping block is blocked by the convex block and the stopping block is unable to move out of the sliding groove. The second connector includes a second insulating core and a plurality of second terminals. The second insulating core has an insertion slot and a blocking rib. The first connector is inserted into the insertion slot, after the first connector is rotated, the blocking block is blocked by the blocking rib. The second connector is combined with the first connector, thereby the first connector is docked with the second connector by the quick docking way, and a connection effect between the first connector and the second connector is ensured.

However, the first connector and the second connector of the conventional electrical connector assembly are docked by use of the quick docking way to ensure the connection effect between the first connector and the second connector, the first connector and the second connector are docked by a single locking structure, when the conventional electrical connector assembly vibrates too frequently and intensely, the conventional electrical connector assembly gradually rotates to make the first connector and the second connector loosened from each other.

Thus, it is essential to provide an innovative electrical connector assembly having a double locking structure, so that the electrical connector assembly is ensured to uneasily get loose under a vibration.

SUMMARY OF THE INVENTION

An object of the present invention is to provide an electrical connector assembly. The electrical connector assembly includes an electrical connector, a locking structure and a docking connector. The electrical connector includes a first main module, a plurality of first terminals fastened in the first main module, a first shell mounted around an outer surface of the first main module, and a protective tube. The protective tube is mounted around an outer surface of the first shell. An outer surface of the protective tube protrudes outward to form a mounting portion. One end of the mounting portion is defined as a first position, and the other end of the mounting portion is defined as a second position. An inner surface of the protective tube has a guiding groove. The mounting portion defines a sliding groove penetrating through a rear surface of the mounting portion. An inner wall of the sliding groove defines a perforation penetrating through the inner wall of the sliding groove in a radial direction of the protective tube. The sliding groove and the guiding groove are communicated through the perforation. The locking structure is disposed to the mounting portion. An inner surface of the locking structure protrudes towards the first shell to form a location foot. The docking connector is docked with the electrical connector. The docking connector includes a second main module, a plurality of second terminals fastened in the second main module, and a second shell mounted around an outer surface of the second main module. The second shell has a protrusion. The protrusion is inserted in the guiding groove. When the protective tube is rotated, the protrusion slides along the guiding groove, the protrusion slides from a front end of the guiding groove to a rear end of the guiding groove. When the protrusion is located at the front end of the guiding groove, the locking structure is located at the first position, the location foot of the locking structure is disposed in the sliding groove of the protective tube. When the protrusion is located at the rear end of the guiding groove, the locking structure moves to the second position, the protrusion penetrates through the perforation, and the protrusion moves into the guiding groove, and the protrusion is blocked between the front end of the guiding groove and the rear end of the guiding groove.

Another object of the present invention is to provide an electrical connector assembly. The electrical connector assembly includes an electrical connector, a locking structure and a docking connector. The electrical connector includes a first main module, a plurality of first terminals fastened in the first main module, a first shell mounted around an outer surface of the first main module, and a protective tube mounted around an outer surface of the first shell. An outer surface of the protective tube protrudes outward to form a mounting portion. One end of the mounting portion is defined as a first position, and the other end of the mounting portion is defined as a second position. An inner surface of the protective tube has a guiding groove. The mounting portion defines a sliding groove penetrating through a rear surface of the mounting portion. A front of an inner wall of the sliding groove defines a perforation penetrating through the inner wall of the sliding groove in a radial direction of the protective tube. A rear of the inner wall of the sliding groove has a step. The sliding groove and the guiding groove are communicated through the perforation. The locking structure is disposed to the mounting portion. A front of an inner surface of the locking structure protrudes towards the first shell to form a location foot. A rear of the inner surface of the locking structure protrudes downward, then slantwise extends rearward and downward, and further extends rearward to form an abutting portion. The docking connector is docked with the electrical connector. The docking connector includes a second main module, a plurality of second terminals fastened in the second main module, and a second shell mounted around an outer surface of the second main module. The second shell has a protrusion. The protrusion is inserted in the guiding groove. When the protective tube of the electrical connector is rotated, the protrusion slides along the guiding groove, the protrusion slides from a front end of the guiding groove to a rear end of the guiding groove, so the electrical connector is locked with the docking connector for a first time, the electrical connector assembly is in a first locking status, the locking structure is located at the first position, the abutting portion abuts against the step, the location foot faces the inner wall of the sliding groove. When the locking structure moves from the first position to the second position, the abutting portion is separated from the step, the location foot moves to the perforation, and the location foot abuts against the protrusion of the docking connector, so the electrical connector is locked with the docking connector for a second time.

Another object of the present invention is to provide an electrical connector assembly. The electrical connector assembly includes an electrical connector, a locking structure and a docking connector. The electrical connector includes a first main module, a plurality of first terminals fastened in the first main module, a first shell mounted around an outer surface of the first main module, and a protective tube mounted around an outer surface of the first shell. An outer surface of the protective tube protrudes outward to form a mounting portion. One end of the mounting portion is defined as a first position, and the other end of the mounting portion is defined as a second position. An inner surface of the protective tube has a guiding groove. The mounting portion defines a sliding groove penetrating through a rear surface of the mounting portion. A rear end of an inner wall of the sliding groove is recessed inward and towards a center of the protective tube to form a first fastening groove. The first fastening groove has a first platform, a second platform and a perforation along a rear-to-front direction. An inner surface of the first fastening groove is defined as the first platform. A front of the first platform is recessed inward to form the second platform. A front of the second platform defines the perforation penetrating through the inner wall of the sliding groove in a radial direction of the protective tube. The sliding groove and the guiding groove are communicated through the perforation. The locking structure is disposed to the mounting portion. The locking structure has a main body. The main body extends downward and expands outward to form a lower portion. The lower portion is disposed in the sliding groove. A front end of an inner surface of the lower portion extends towards the first shell to form a location foot. A rear end of a bottom surface of the main body protrudes downward, then slantwise extends rearward and downward, and further extends rearward to form an abutting portion. The docking connector is docked with the electrical connector. The docking connector includes a second main module, a plurality of second terminals fastened in the second main module, and a second shell mounted around an outer surface of the second main module. The second shell has a protrusion. The protrusion is inserted in the guiding groove. When the protective tube of the electrical connector is rotated, the protrusion slides along the guiding groove, the protrusion slides from a front end of the guiding groove to a rear end of the guiding groove, so the electrical connector is locked with the docking connector for a first time. The electrical connector assembly is in a first locking status. The locking structure is located at the first position. When the locking structure is located at the first position, the abutting portion abuts against a rear end of the first platform of the mounting portion, the location foot abuts against the second platform of the mounting portion, when the locking structure moves from the first position to the second position, the abutting portion abuts against a front end of the first platform of the mounting portion, the location foot moves away from the second platform, the location foot moves to the perforation, and the location foot abuts against the protrusion of the docking connector, so the electrical connector is locked with the docking connector for a second time, the electrical connector assembly is in a second locking status.

As described above, the protective tube of the electrical connector is rotated, so that the electrical connector is locked with the docking connector for the first time, and the electrical connector assembly is in the first locking status. The locking structure is pushed from the first position to the second position so as to make that the electrical connector is locked with the docking connector for the second time, and the electrical connector assembly is in the second locking status, the protective tube is prevented from making that the electrical connector and the docking connector get loose due to a vibration, on the contrary, the locking structure is pushed from the second position back to the first position, the protective tube is reversely rotated to make the electrical connector separated from the docking connector. Thus, the electrical connector assembly has a double locking structure and a double locking function, the electrical connector assembly is uneasy to get loose due to the vibration, the guiding groove is changed into any shape which is cooperated with the location foot to act as a guiding function. An actuating stroke of the locking structure is without being limited to a longitudinal reciprocating movement along the docking direction of the electrical connector assembly, the locking structure is cooperated with a shape design of the guiding groove to reciprocally move along a transverse direction which is orthogonal to the docking direction of the electrical connector assembly, or the locking structure moves along an inclining direction with respect to the docking direction of the electrical connector assembly. When the locking structure moves to the first position, the docking connector is receded, when the locking structure moves to the second position, the protrusion of the docking connector is blocked in a moving path of the guiding groove, and the moving path of the guiding groove is replaceable. As a result, the electrical connector assembly is ensured to uneasily get loose under the vibration.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
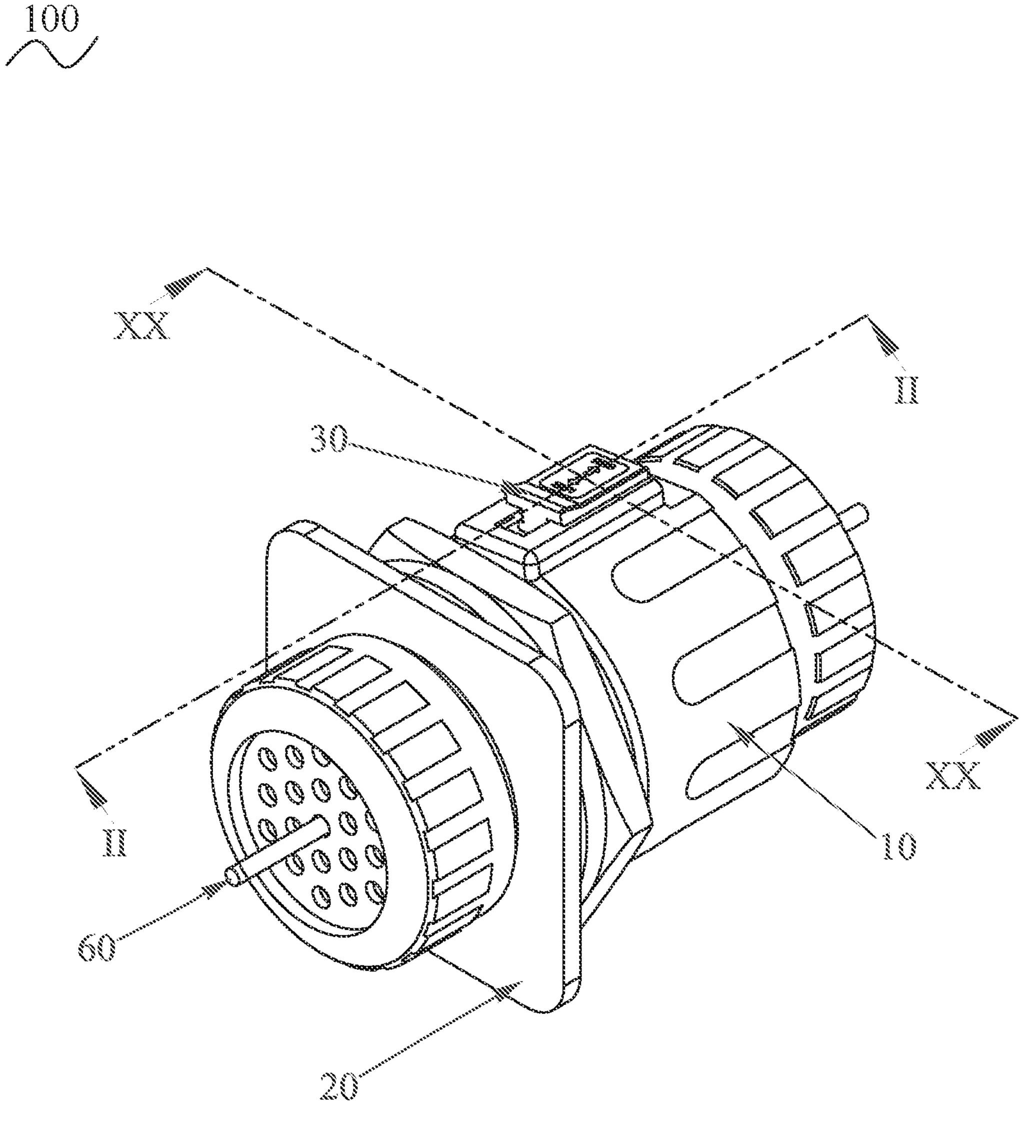
FIG. 1 is a perspective view of an electrical connector assembly in accordance with a preferred embodiment of the present invention.
Figure 2:
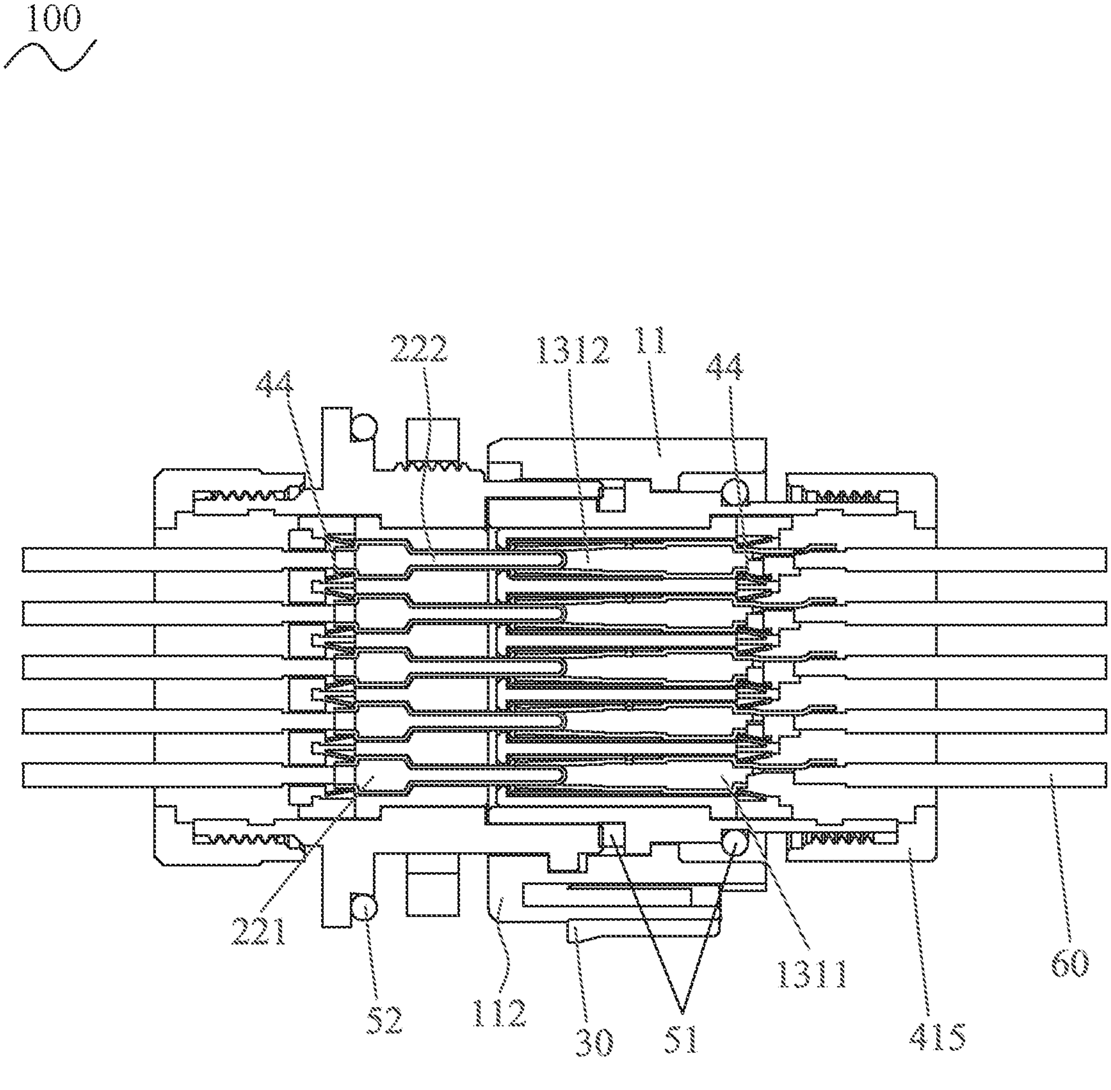
FIG. 2 is a sectional view of the electrical connector assembly along a line II-II of FIG. 1.
Figure 3:
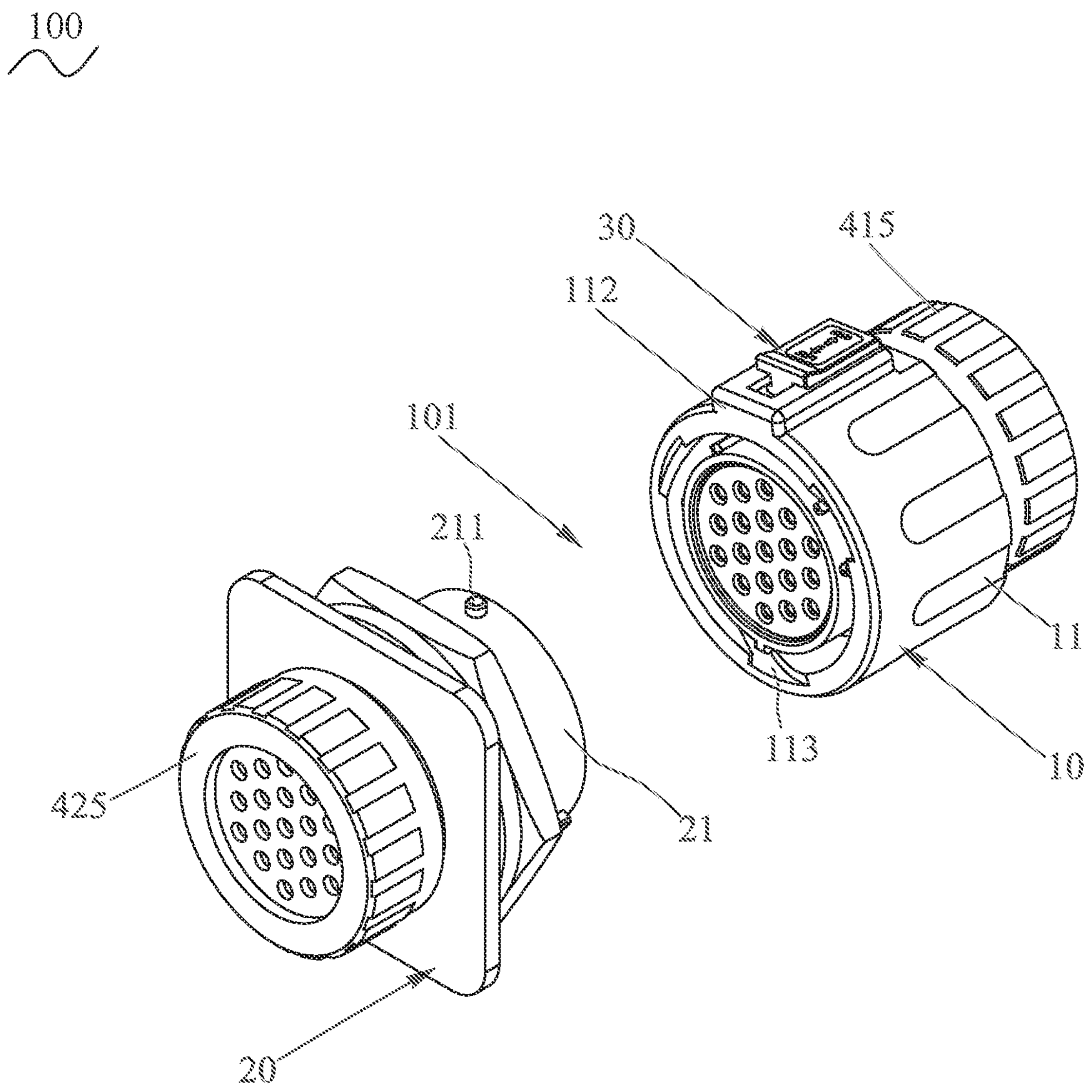
FIG. 3 is an exploded view of the electrical connector assembly of FIG. 1.
Figure 4:
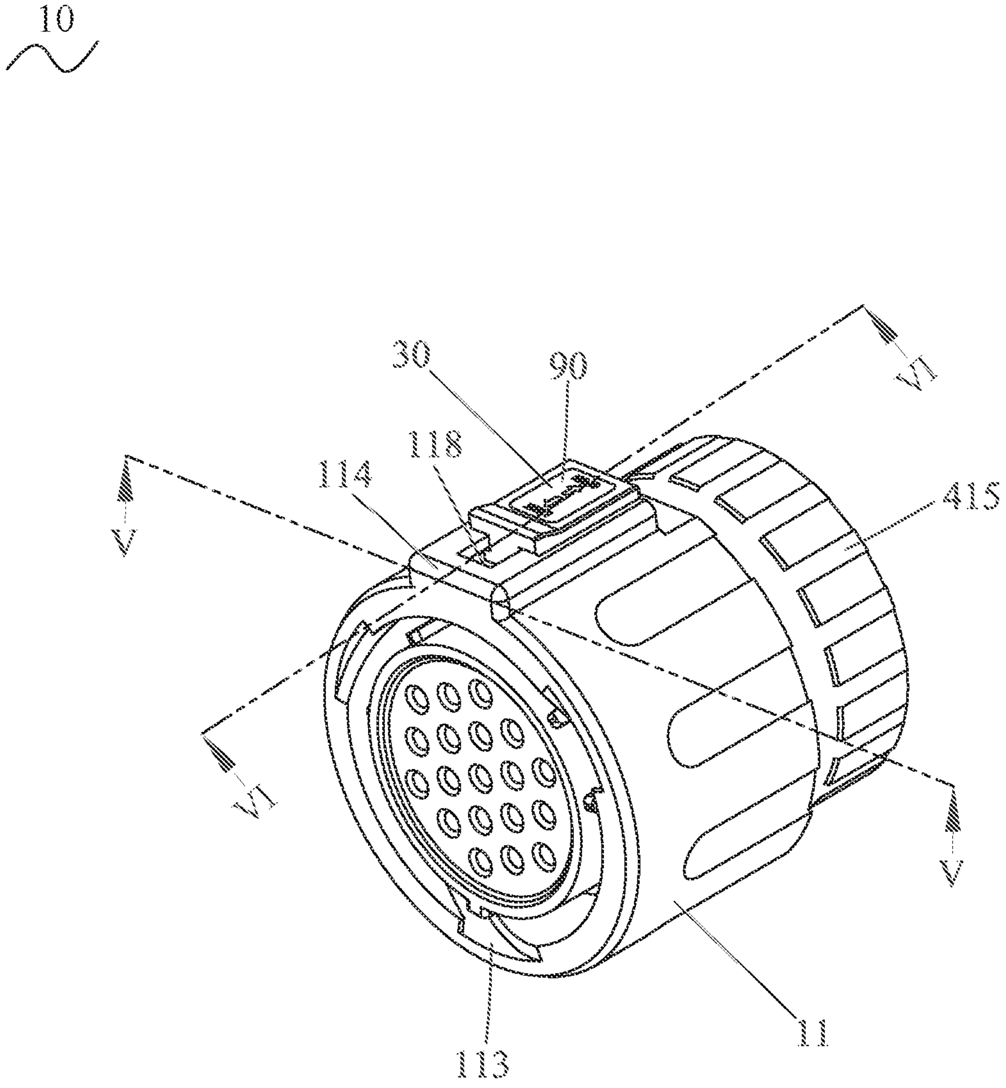
FIG. 4 is a perspective view of an electrical connector of the electrical connector assembly of FIG. 3, wherein the electrical connector is located at a first position.
Figure 5:
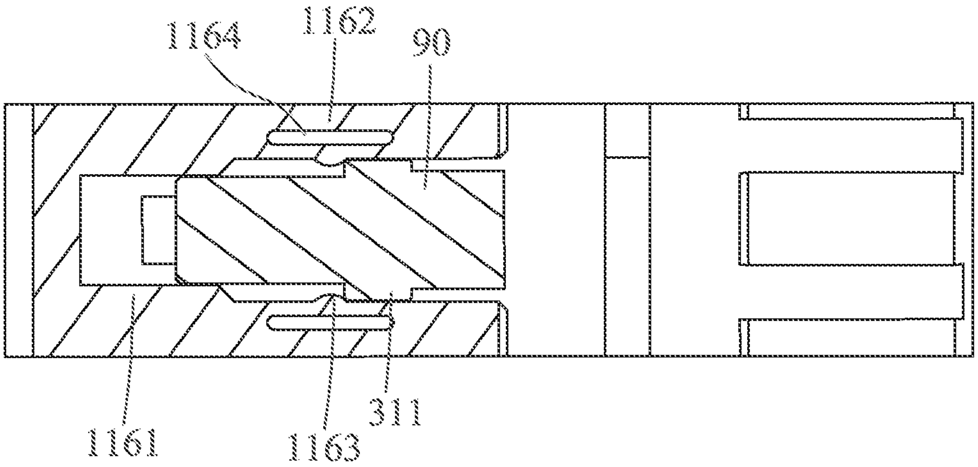
FIG. 5 is a sectional view of the electrical connector of the electrical connector assembly along a line V-V of FIG. 4.
Figure 6:
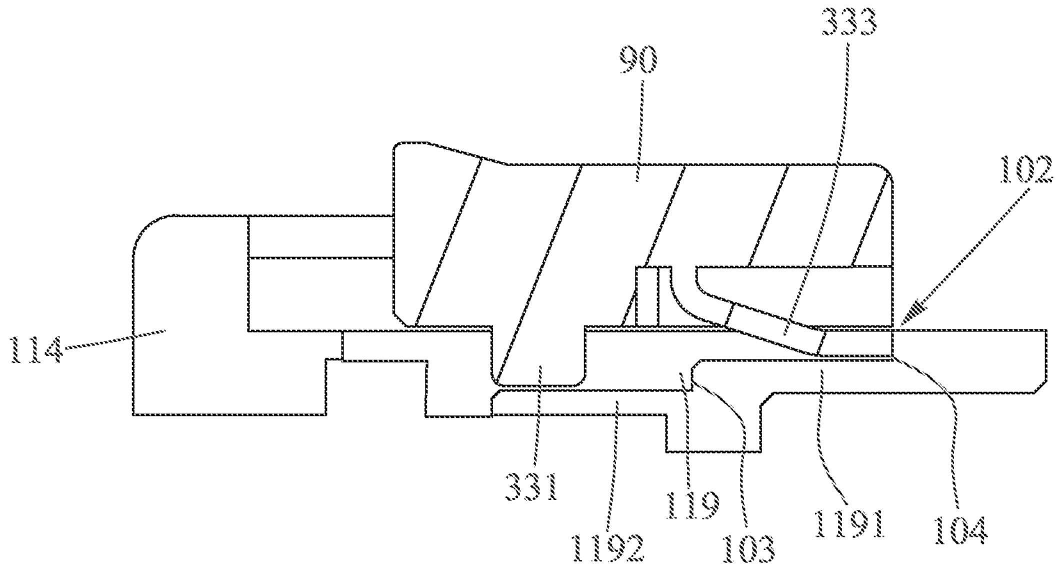
FIG. 6 is another sectional view of the electrical connector of the electrical connector assembly along a line VI-VI of FIG. 4.
Figure 7:
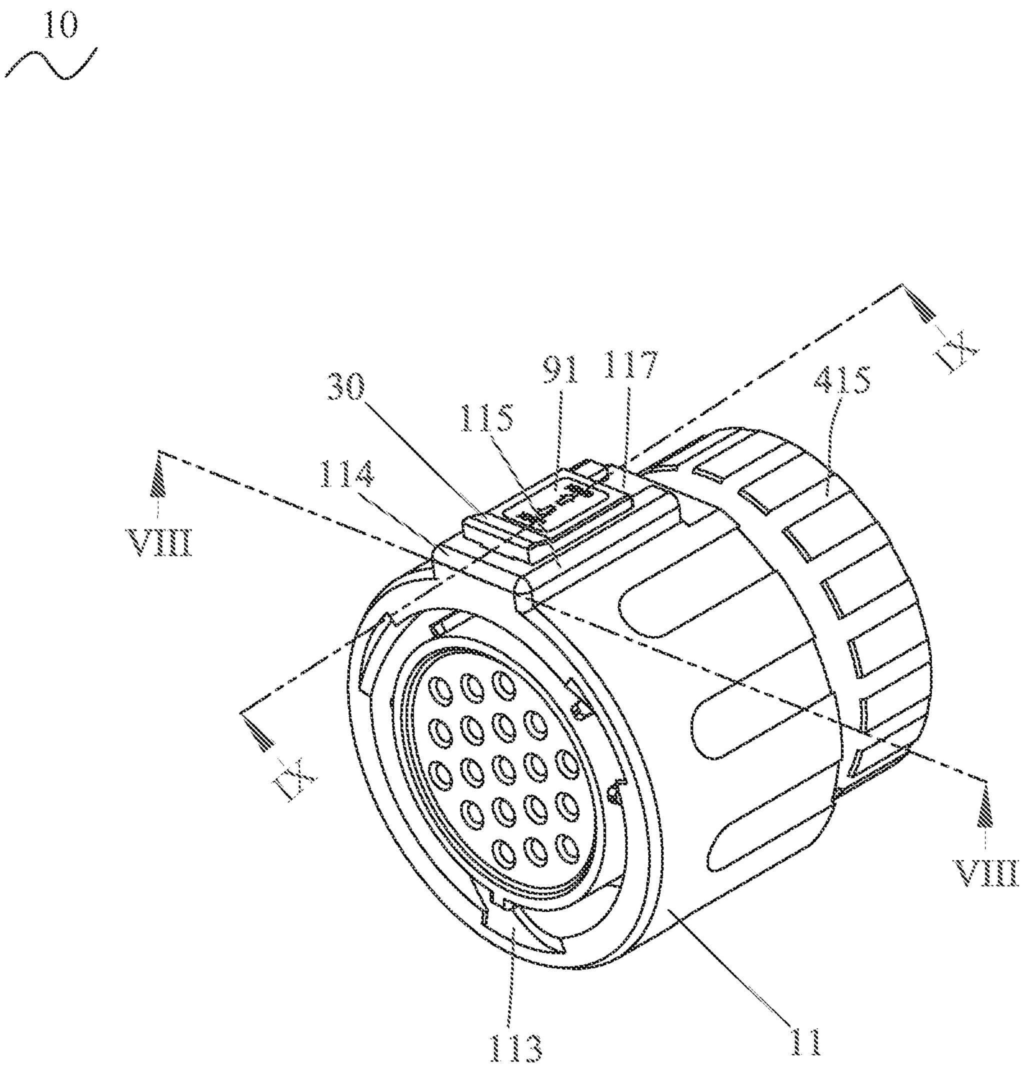
FIG. 7 is a perspective view of the electrical connector of the electrical connector assembly of FIG. 3, wherein the electrical connector is located at a second position.
Figure 8:
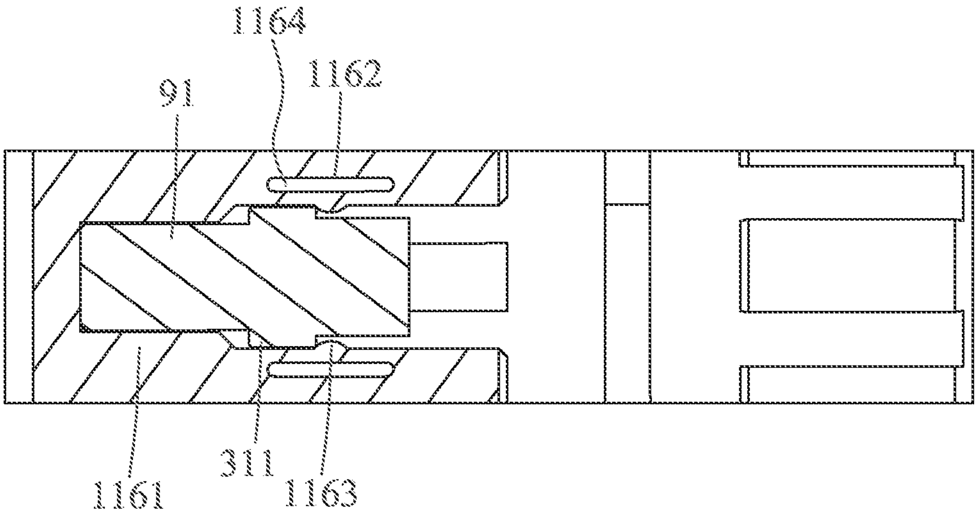
FIG. 8 is a sectional view of the electrical connector of the electrical connector assembly along a line VIII-VIII of FIG. 7.
Figure 9:
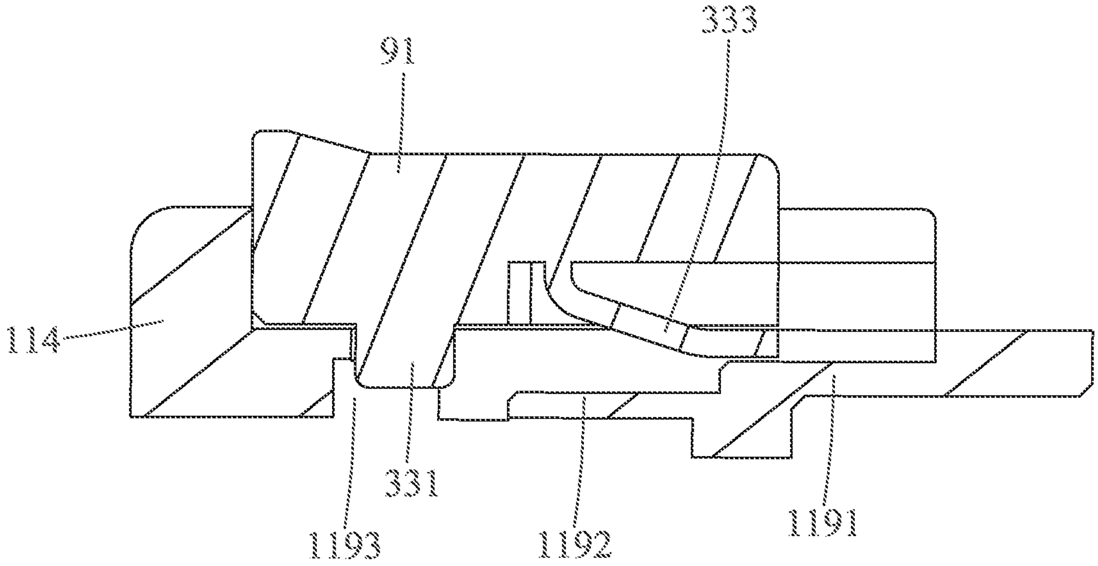
FIG. 9 is another sectional view of the electrical connector of the electrical connector assembly along a line IX-IX of FIG. 7.
Figure 10:
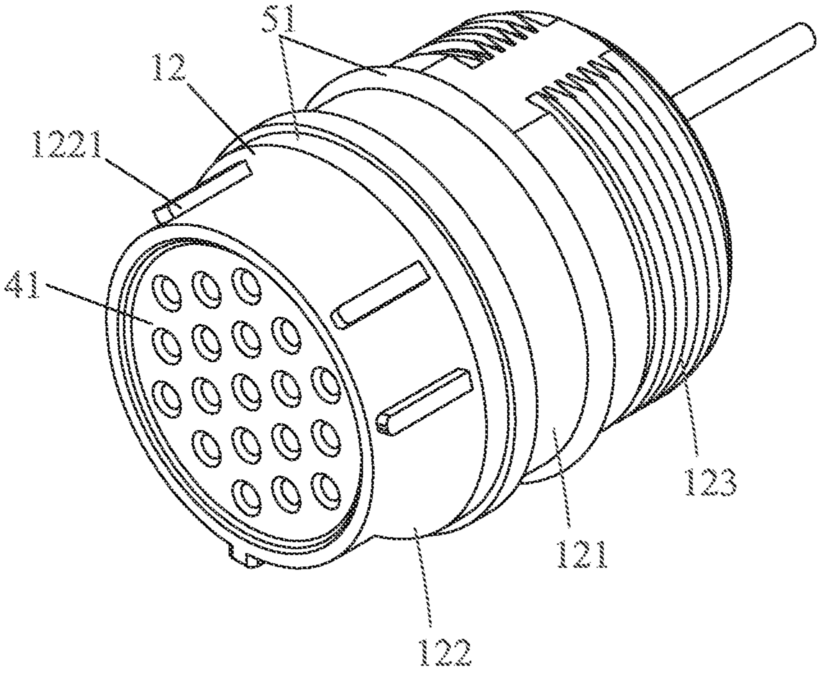
FIG. 10 is a partially perspective view of the electrical connector of the electrical connector assembly of FIG. 3.
Figure 11:
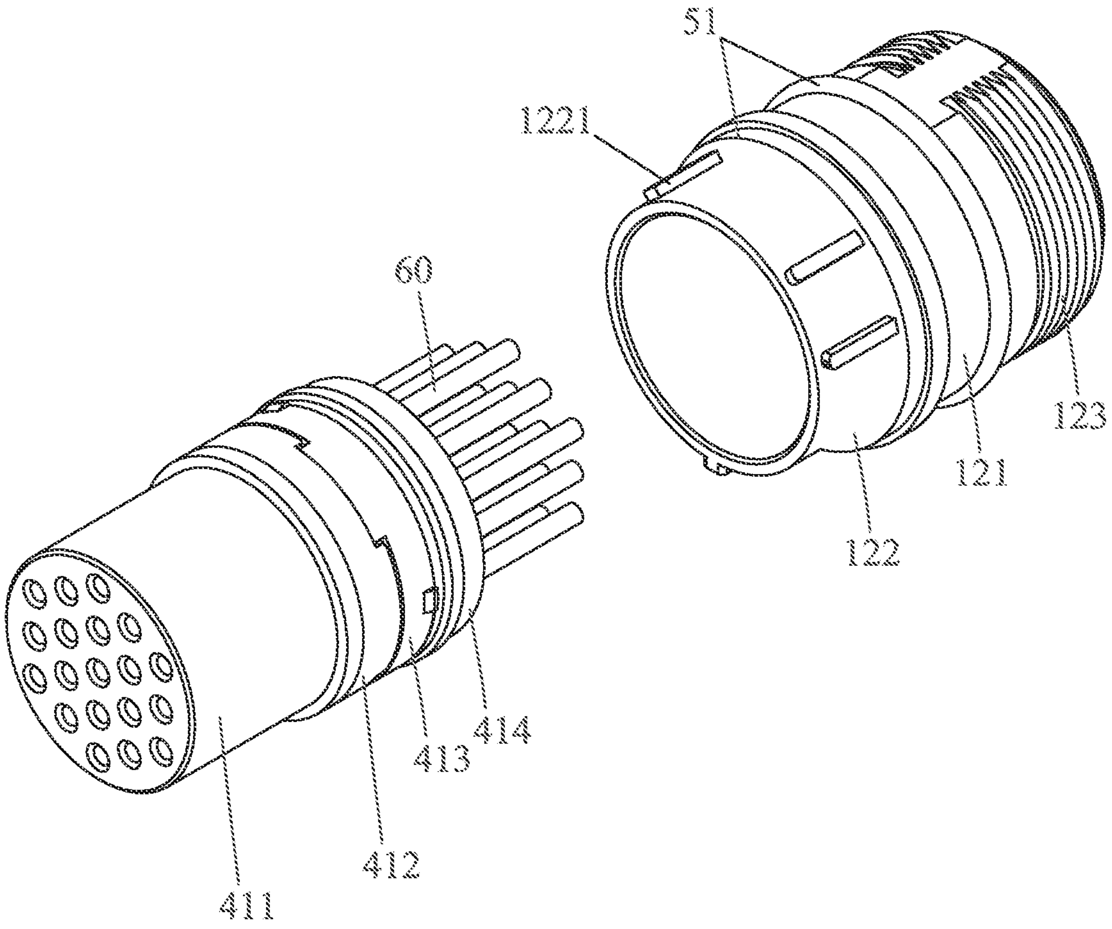
FIG. 11 is a partially exploded view of the electrical connector of the electrical connector assembly of FIG. 3.
Figure 12:
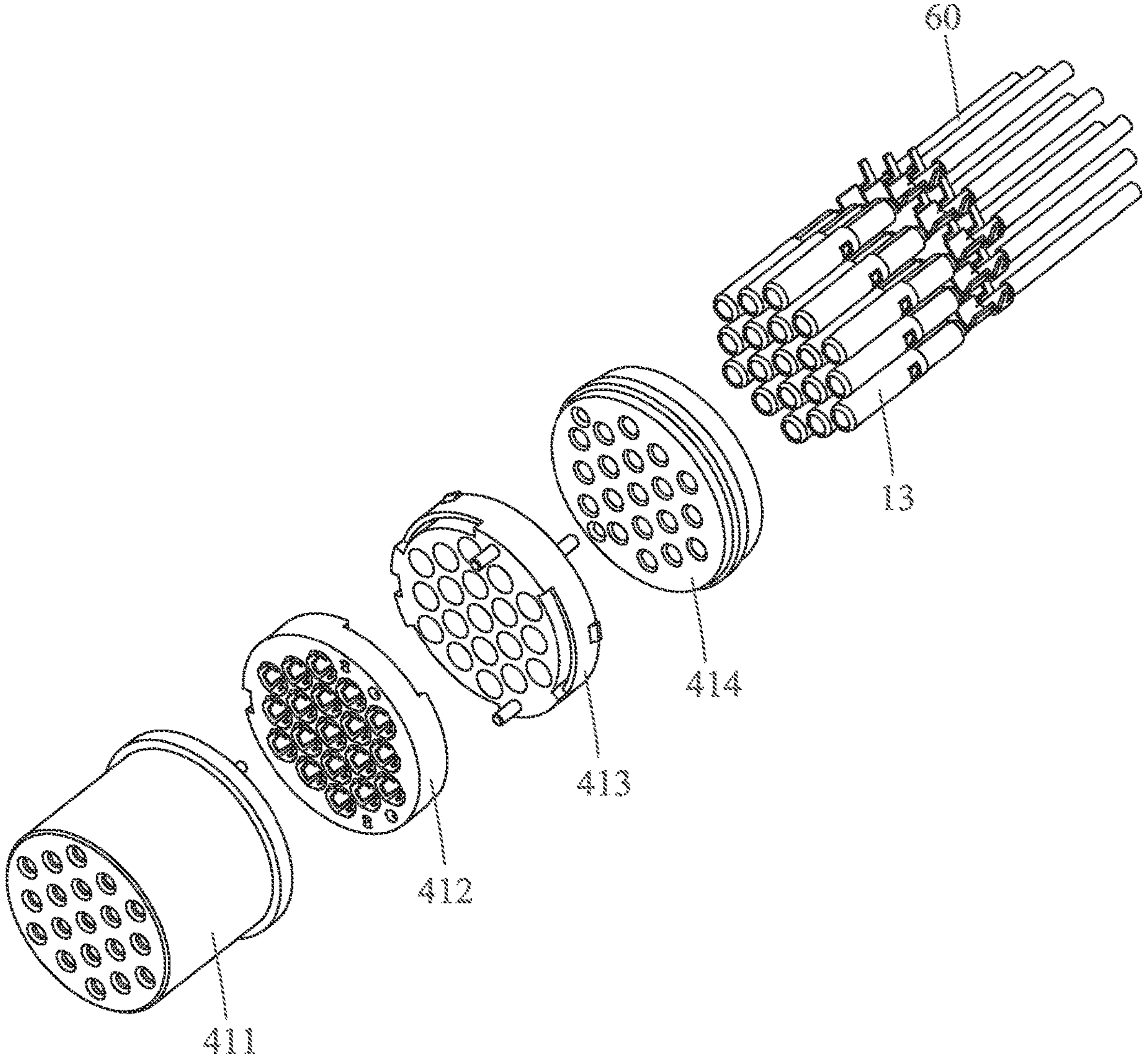
FIG. 12 is another partially exploded view of the electrical connector of the electrical connector assembly of FIG. 3.
Figure 13:
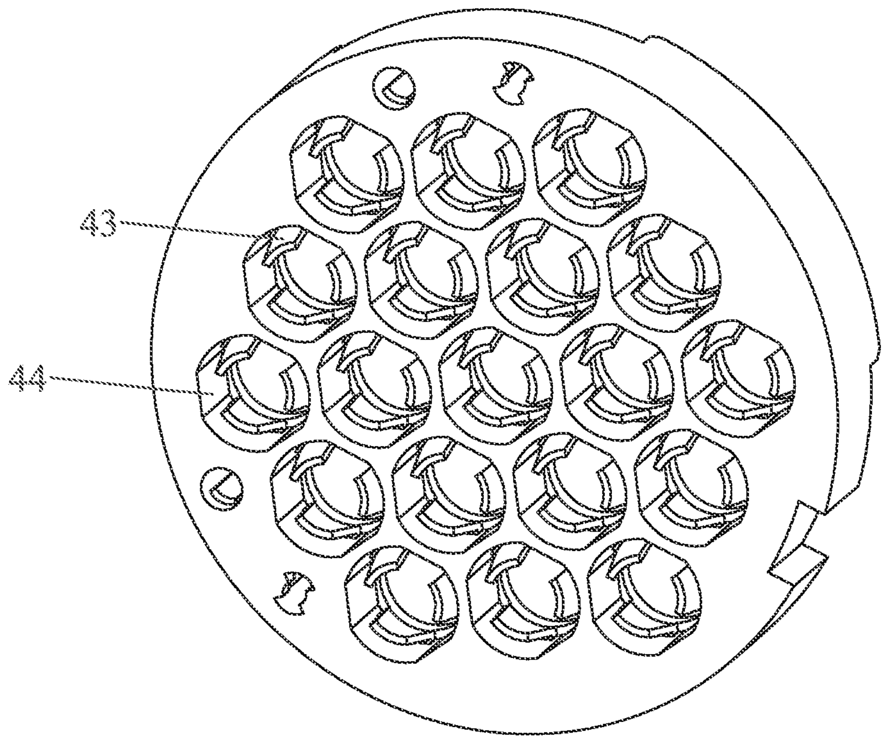
FIG. 13 is a perspective view of a first stopping portion of a first main module of the electrical connector of the electrical connector assembly of FIG. 3.
Figure 14:
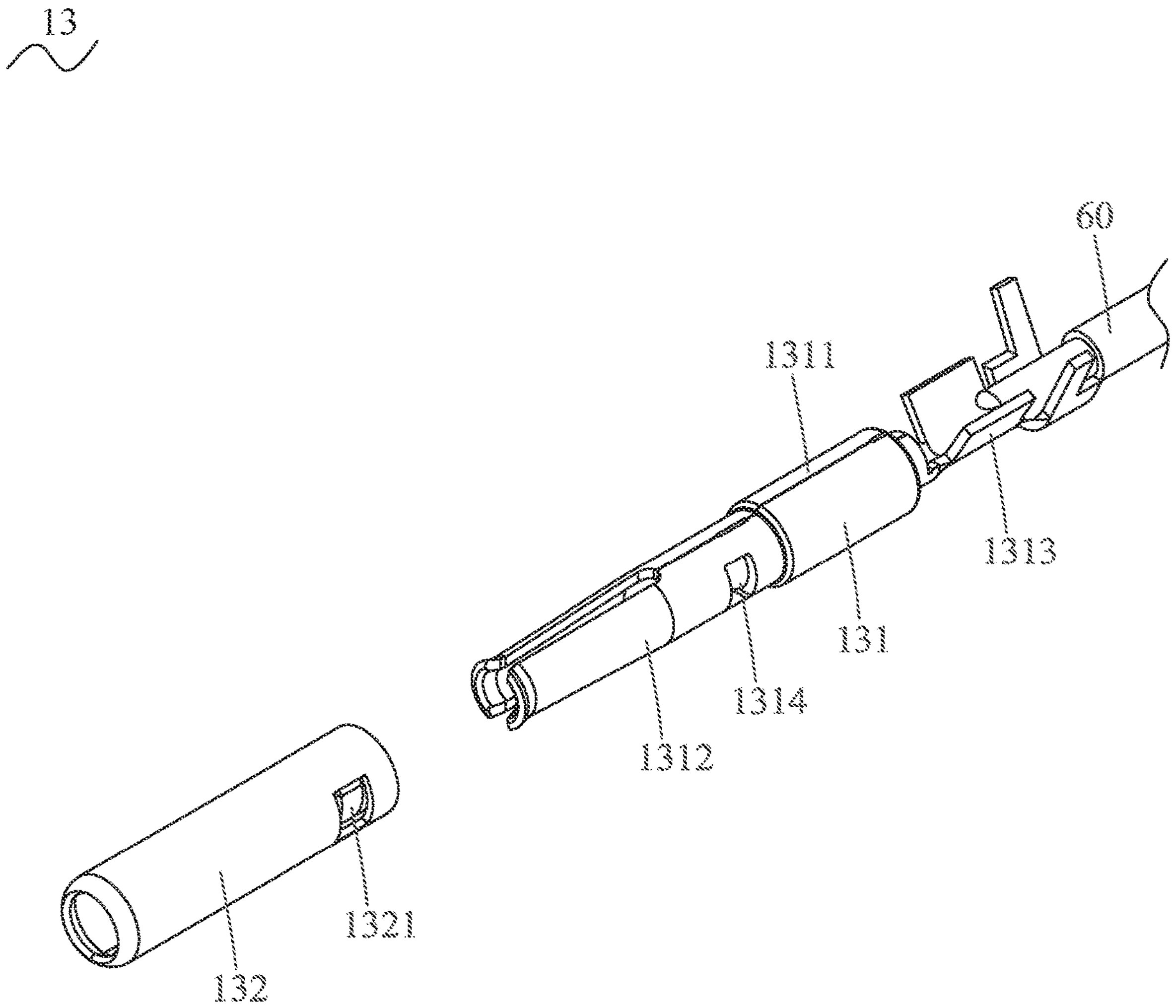
FIG. 14 is an exploded view of a first terminal of the electrical connector of the electrical connector assembly of FIG. 3.
Figure 15:
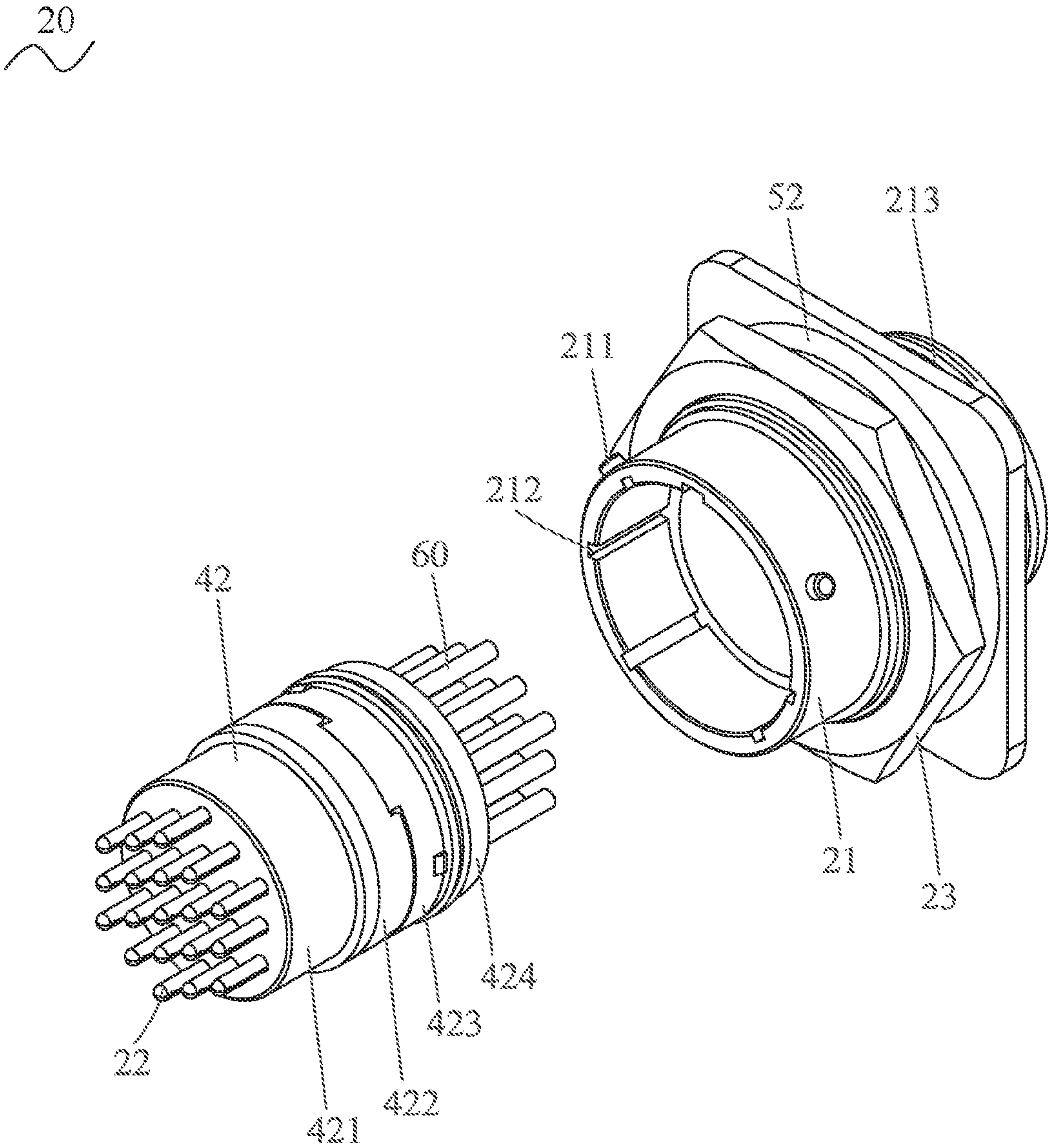
FIG. 15 is an exploded view of a docking connector of the electrical connector assembly of FIG. 3.
Figure 16:
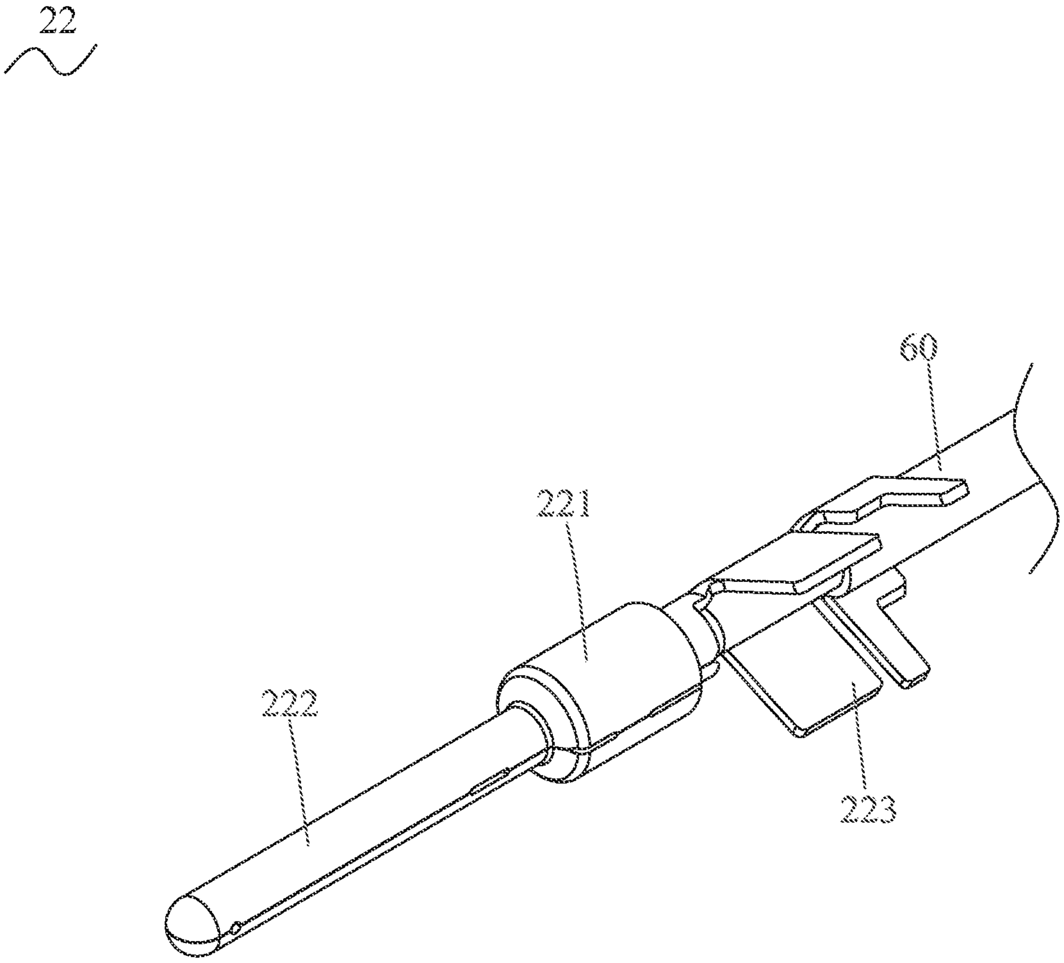
FIG. 16 is a perspective view of a second terminal of the docking connector of the electrical connector assembly of FIG. 11.
Figure 17:
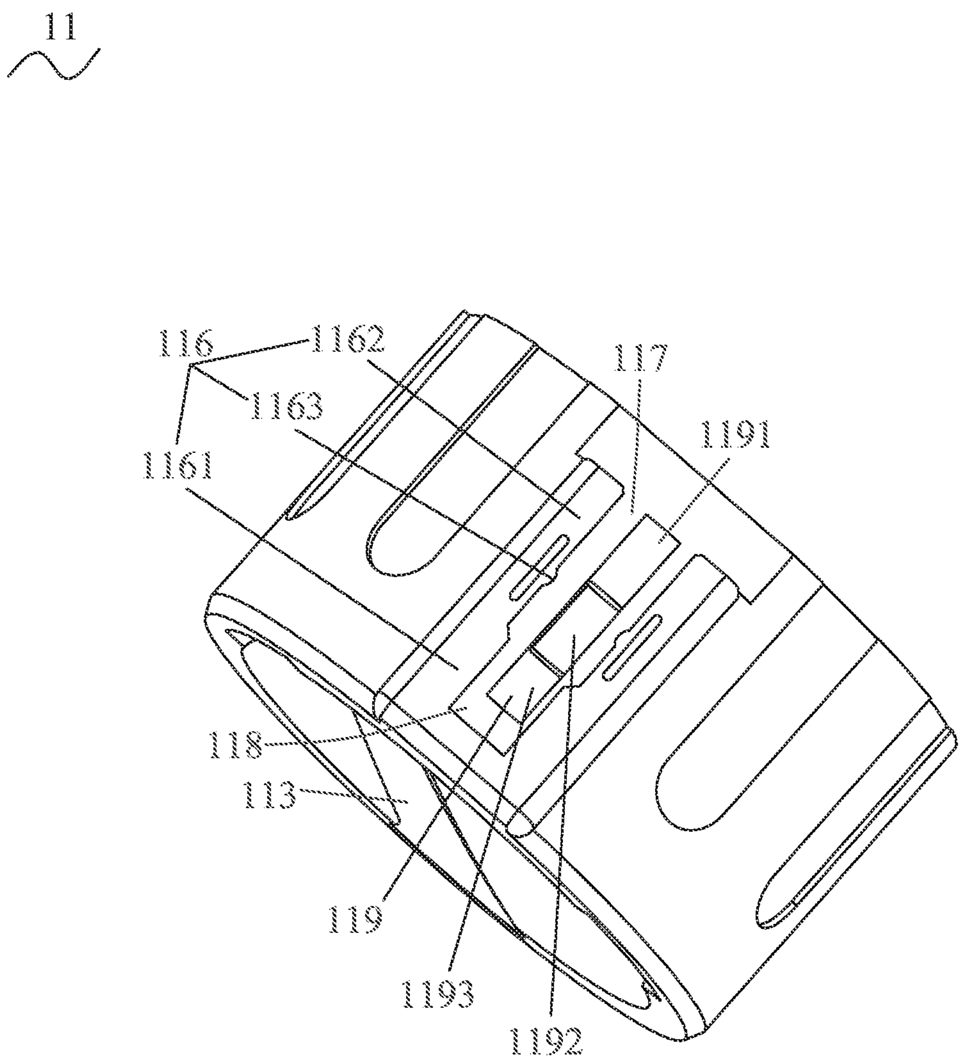
FIG. 17 is a perspective view of a protective tube of the electrical connector of the electrical connector assembly of FIG. 3.
Figure 18:
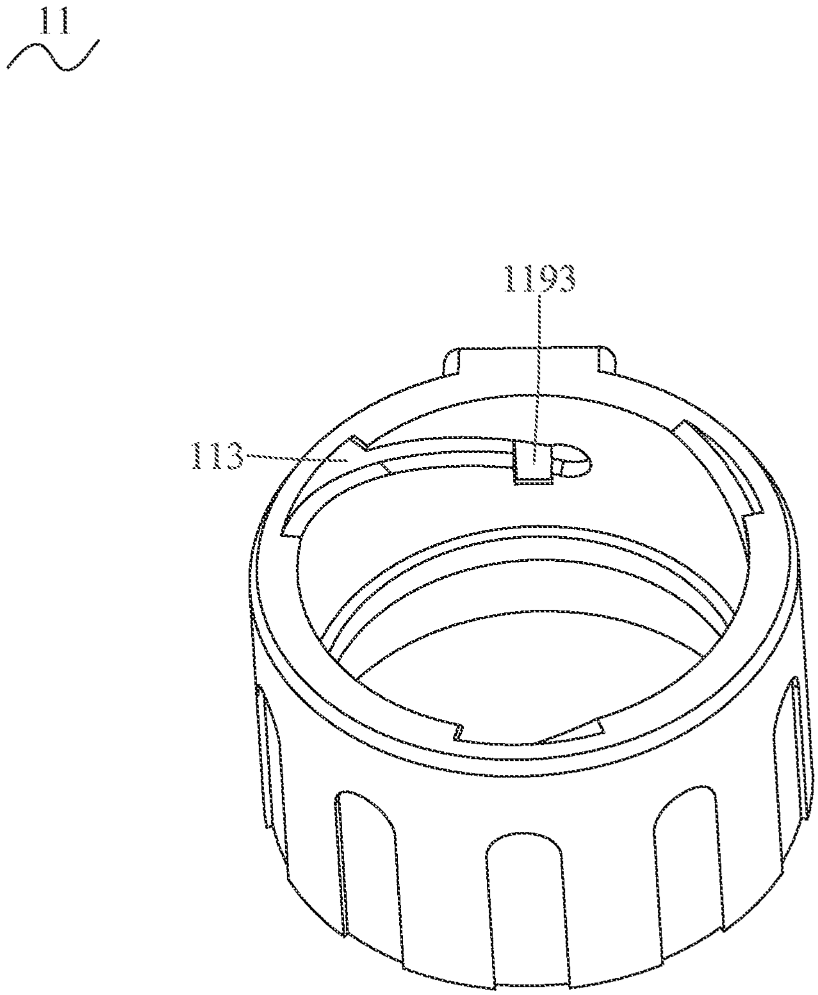
FIG. 18 is another perspective view of the protective tube of the electrical connector of the electrical connector assembly of FIG. 3.
Figure 19:
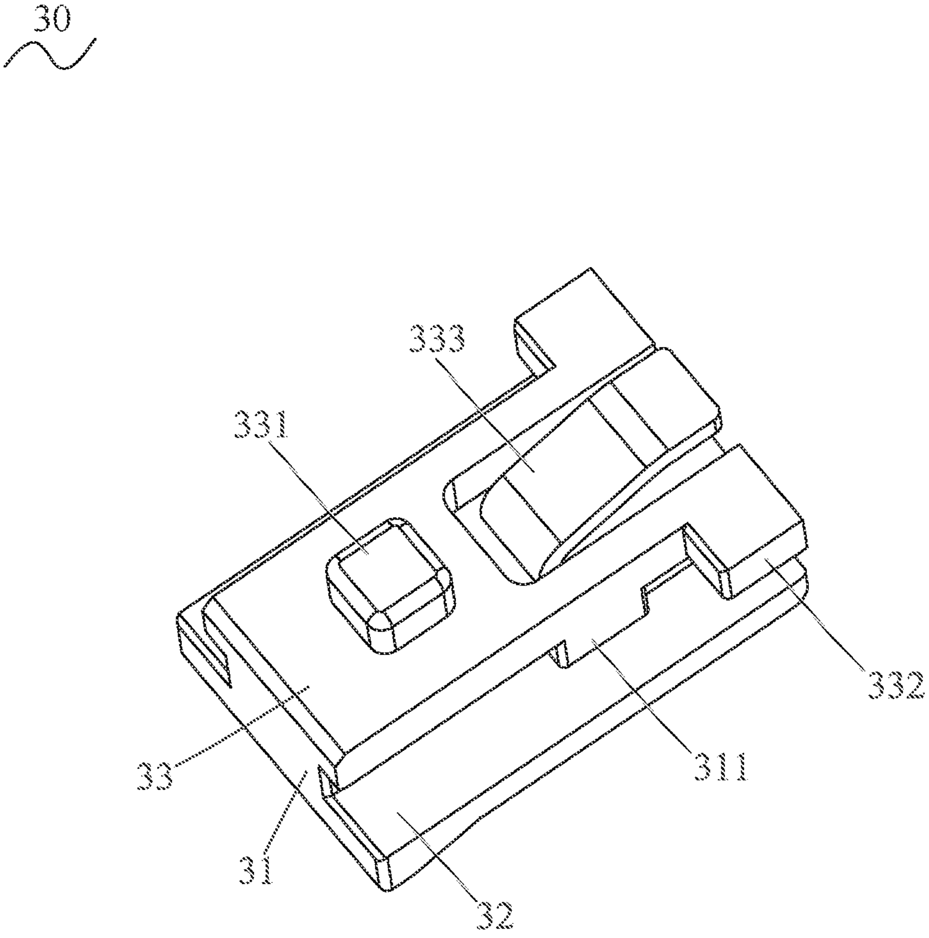
FIG. 19 is a perspective view of a locking structure of the electrical connector assembly of FIG. 3.
Figure 20:
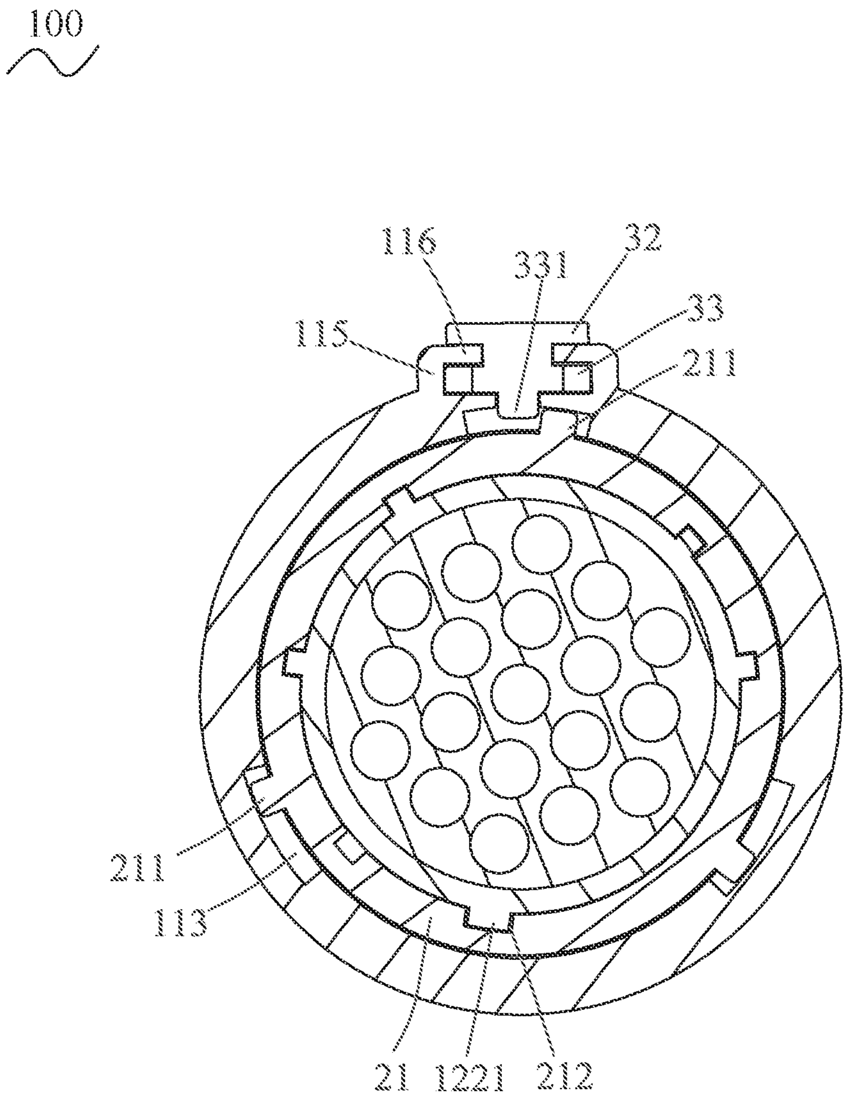
FIG. 20 is a sectional view of the electrical connector assembly along a line XX-XX of FIG. 1.

With reference to FIG. 1 to FIG. 3, an electrical connector assembly 100 in accordance with a preferred embodiment of the present invention is shown. The electrical connector assembly 100 includes an electrical connector 10, a docking connector 20 and a locking structure 30.

The docking connector 20 is docked with the electrical connector 10. The docking connector 20 is fastened to the electrical connector 10. The locking structure 30 is disposed to an outer surface of the electrical connector 10. In the preferred embodiment, a docking end of the electrical connector 10 is defined as a front end of the electrical connector 10, and a docking end of the docking connector 20 is defined as a rear end of the docking connector 20. A front surface of the electrical connector 10 and a rear surface of the docking connector 20 are defined as docking surfaces 101.

Referring to FIG. 4 to FIG. 12, the electrical connector 10 includes a protective tube 11, a first shell 12, a plurality of first terminals 13, a first main module 41 and a plurality of first waterproof rings 51. In the preferred embodiment, the electrical connector 10 has two first waterproof rings 51. The plurality of the first terminals 13 are fastened in the first main module 41. The protective tube 11 is mounted around a front end of an outer surface of the first shell 12. The first shell 12 is mounted around an outer surface of the first main module 41 of the electrical connector 10. The first main module 41 surrounds the plurality of the first terminals 13. Rear ends of the plurality of the first terminals 13 are connected with a plurality of cables 60. The two first waterproof rings 51 are mounted around the outer surface of the first shell 12. The two first waterproof rings 51 are spaced from each other. The protective tube 11 surrounds the two first waterproof rings 51. The two first waterproof rings 51 are disposed between the protective tube 11 and the first shell 12. The protective tube 11 is spaced from the first shell 12.

An outer surface of the protective tube 11 protrudes outward to form a mounting portion 112. The mounting portion 112 is a U shape. An opening 117 of the mounting portion 112 faces rearward. An inner surface of the protective tube 11 of the electrical connector 10 has a guiding groove 113. The inner surface of the protective tube 11 of the electrical connector 10 has a plurality of the guiding grooves 113. In the preferred embodiment, the guiding groove 113 is an inclined groove slantwise extending rearward and sideward. In the preferred embodiment, the protective tube 11 of the electrical connector 10 has three guiding grooves 113. The three guiding grooves 113 are evenly distributed around the inner surface of the protective tube 11 of the electrical connector 10. The plurality of the guiding grooves 113 are used for buckling a corresponding mechanism of the docking connector 20. A position of the mounting portion 112 is corresponding to one guiding groove 113. In a concrete implementation, a position of the mounting portion 112 is able to be disposed to an outer side of any guiding groove 113, or positions of a plurality of the mounting portions 112 are able to be designed at the outer sides of the plurality of the guiding grooves 113.

Referring to FIG. 3 to FIG. 15, the docking connector 20 has a second shell 21, a plurality of second terminals 22, a screw 23, a second main module 42 and a second waterproof ring 52. The plurality of the second terminals 22 are fastened in the second main module 42. The second shell 21 is mounted around an outer surface of the second main module 42 of the docking connector 20. A rear end of the second shell 21 is inserted between the protective tube 11 of the electrical connector 10 and the first shell 12 of the electrical connector 10. The screw 23 is fastened around an outer surface of the second shell 21. The second main module 42 surrounds the plurality of the second terminals 22. Front ends of the plurality of the second terminals 22 are connected with the plurality of the cables 60. Rear ends of the plurality of the second terminals 22 are inserted into the plurality of the first terminals 13. The second waterproof ring 52 of the docking connector 20 is mounted around the outer surface of the second shell 21. The second waterproof ring 52 of the docking connector 20 is disposed to a rear end of the screw 23.

Referring to FIG. 3 to FIG. 15, the first main module 41 has a first main portion 411, a first stopping portion 412, a first buckling portion 413, a first silicone portion 414 and a first cover 415 along a docking direction of the electrical connector assembly 100. In the preferred embodiment, the first main portion 411, the first stopping portion 412, the first buckling portion 413, the first silicone portion 414 and the first cover 415 are arranged along a front-to-rear direction. The second main module 42 of the docking connector 20 is disposed opposite to the first main module 41 of the electrical connector 10. The second main module 42 of the docking connector 20 has a second main portion 421, a second stopping portion 422, a second buckling portion 423, a second silicone portion 424 and a second cover 425 along a rear-to-front direction. The first main portion 411 of the first main module 41 of the electrical connector 10 faces the second main portion 421 of the second main module 42 of the docking connector 20. In the preferred embodiment, the first stopping portion 412, the first buckling portion 413, the first silicone portion 414 and the first cover 415 of the first main module 41 of the electrical connector 10 and the second stopping portion 422, the second buckling portion 423, the second silicone portion 424 and the second cover 425 of the second main module 42 of the docking connector 20 are mirrored with respect to the first main portion 411 of the first main module 41 of the electrical connector 10 and the second main portion 421 of the second main module 42 of the docking connector 20.

Referring to FIG. 4 to FIG. 11, the first main portion 411 of the first main module 41 of the electrical connector 10 surrounds the plurality of the first terminals 13 of the electrical connector 10. The first stopping portion 412 of the first main module 41 of the electrical connector 10 is disposed to a rear end of the first main portion 411 of the first main module 41 of the electrical connector 10. The first stopping portion 412 of the first main module 41 of the electrical connector 10 is used for fastening the plurality of the first terminals 13 of the electrical connector 10. The first buckling portion 413 of the first main module 41 of the electrical connector 10 is disposed to a rear end of the first stopping portion 412 of the first main module 41 of the electrical connector 10. The first buckling portion 413 of the first main module 41 of the electrical connector 10 is used for fastening the rear ends of the plurality of the first terminals 13 of the electrical connector 10. The first silicone portion 414 of the first main module 41 of the electrical connector 10 is disposed to a rear end of the first buckling portion 413 of the first main module 41 of the electrical connector 10. The first silicone portion 414 of the first main module 41 of the electrical connector 10 surrounds parts of the plurality of the cables 60. The first cover 415 of the first main module 41 of the electrical connector 10 is disposed around a rear end of the first shell 12 of the electrical connector 10.

Referring to FIG. 3 to FIG. 15, the second main portion 421 of the second main module 42 of the docking connector 20 surrounds parts of the plurality of the second terminals 22 of the docking connector 20. The second stopping portion 422 of the second main module 42 of the docking connector 20 is disposed to a front end of the second main portion 421 of the second main module 42 of the docking connector 20. The second stopping portion 422 of the second main module 42 of the docking connector 20 is used for fastening the plurality of the second terminals 22 of the docking connector 20. The second buckling portion 423 of the second main module 42 of the docking connector 20 is disposed to a front end of the second stopping portion 422 of the second main module 42 of the docking connector 20. The second buckling portion 423 of the second main module 42 of the docking connector 20 is used for fastening the front ends of the plurality of the second terminals 22 of the docking connector 20. The second silicone portion 424 of the second main module 42 of the docking connector 20 is disposed to a front end of the second buckling portion 423 of the second main module 42 of the docking connector 20. The second silicone portion 424 of the second main module 42 of the docking connector 20 surrounds the parts of the plurality of the cables 60. The second cover 425 of the second main module 42 of the docking connector 20 is disposed to a front end of the second shell 21 of the docking connector 20.

Referring to FIG. 8 to FIG. 15, the first stopping portion 412 has a plurality of terminal slots 43 penetrating through a front surface and a rear surface of the first stopping portion 412. The second stopping portion 422 has the plurality of the terminal slots 43 penetrating through a front surface and a rear surface of the second stopping portion 422. An inner surface of each terminal slot 43 has a plurality of stopping plates 44 gradually extending inward and towards the first main portion 411 and the second main portion 421. When the electrical connector 10 is inserted into or withdrawn from the docking connector 20, the plurality of the stopping plates 44 abut against the plurality of the first terminals 13 of the electrical connector 10 and the plurality of the second terminals 22 of the docking connector 20, so that when the plurality of the first terminals 13 of the electrical connector 10 and the plurality of the second terminals 22 of the docking connector 20 are pulled, the plurality of the first terminals 13 of the electrical connector 10 and the plurality of the second terminals 22 of the docking connector 20 are prevented being withdrawn from the first main module 41 and the second main module 42.

In the preferred embodiment, the first main portion 411 of the electrical connector 10 need fully surround the plurality of the first terminals 13, so a length of the first main portion 411 of the electrical connector 10 is longer than a length of the second main portion 421 of the docking connector 20.

In the preferred embodiment, the first stopping portion 412, the first buckling portion 413, the first silicone portion 414 and the first cover 415 of the first main module 41 of the electrical connector 10 and the second stopping portion 422, the second buckling portion 423, the second silicone portion 424 and the second cover 425 of the second main module 42 of the docking connector 20 have the same structure design to reduce design time and mold costs.

Referring to FIG. 1 to FIG. 9, the protective tube 11 of the electrical connector 10 is disposed around the rear end of the second shell 21 of the docking connector 20. One end of the mounting portion 112 away from the docking connector 20 is defined as a first position 90, and the other end of the mounting portion 112 adjacent to the docking connector 20 is defined as a second position 91. In the preferred embodiment, the docking connector 20 is inserted into the protective tube 11 of the electrical connector 10, and then the protective tube 11 of the electrical connector 10 is rotated to proceed with a first locking status of the electrical connector assembly 100, the first locking status of the electrical connector assembly 100 is defined that the locking structure 30 moves to the first position 90, and the electrical connector 10 is fastened to the docking connector 20. The locking structure 30 is disposed to the mounting portion 112. The locking structure 30 is pushed from the first position 90 to the second position 91 to proceed with a second locking status of the electrical connector assembly 100, the second locking status of the electrical connector assembly 100 is defined that the locking structure 30 moves to the second position 91. The locking structure 30 is used for reinforcing a connection relationship between the electrical connector 10 and the docking connector 20 to prevent the protective tube 11 of the electrical connector 10 and the docking connector 20 being loosened by a vibration. On the contrary, when the electrical connector 10 and the docking connector 20 are separated, the locking structure 30 is pushed in advance to move from the second position 91 to the first position 90. The protective tube 11 of the electrical connector 10 is reversely rotated to separate the electrical connector 10 from the docking connector 20.

Referring to FIG. 3 to FIG. 18, the mounting portion 112 has a front wall 114, two side walls 115, two blocking walls 116 and the opening 117. The mounting portion 112 defines a sliding groove 118 penetrating through a rear surface of the mounting portion 112. The sliding groove 118 is formed among the front wall 114, the two side walls 115 and the two blocking walls 116. The front wall 114 is disposed to a front end of the sliding groove 118. The two side walls 115 are disposed to two opposite sides of the sliding groove 118. The two blocking walls 116 are disposed to an outside of the sliding groove 118. The opening 117 is communicated with a rear end of the sliding groove 118. The sliding groove 118 is used for receiving the locking structure 30. A front surface of the protective tube 11 of the electrical connector 10 extends outward and rearward to form the front wall 114. The front wall 114 is disposed to the docking surface 101 of the electrical connector 10, and the front wall 114 is close to the docking connector 20. The two side walls 115 extend along the docking direction of the electrical connector assembly 100. Front ends of the two side walls 115 are connected with the front wall 114. The opening 117 is formed between rear ends of the two side walls 115. A position of the opening 117 is far away from the docking connector 20. Two facing sides of the two side walls 115 extend towards each other to form the two blocking walls 116.

In the preferred embodiment, each blocking wall 116 has a first block 1161, a second block 1162 and a convex portion 1163. Two opposite sides of the front wall 114 extend rearward to form two first blocks 1161. Two outer sides of two rear ends of the two first blocks 1161 extend rearward to form two second blocks 1162. Two inner sides of two rear edges of the two first blocks 1161 slantwise extend rearward and outward. A width of each first block 1161 is wider than a width of each second block 1162. Two middles of two inner sides of the two second blocks 1162 protrude inward to form two convex portions 1163. Positions of two convex portions 1163 of the two blocking walls 116 are opposite to each other. When the locking structure 30 is moved to the second position 91, a corresponding mechanism of the locking structure 30 is buckled to the mounting portion 112 by the convex portion 1163 for ensuring that the locking structure 30 keeps being located at the second position 91. A middle of each second block 1162 has a hollow structure 1164. The convex portion 1163 is corresponding to a middle of the hollow structure 1164. When the locking structure 30 slides, the hollow structure 1164 provides an elastic compression space for the corresponding convex portion 1163. The hollow structure 1164 provides a pressure feedback for the locking structure 30.

Referring to FIG. 6 to FIG. 19, a rear end of an inner wall of the sliding groove 118 is recessed inward and towards a center of the protective tube 11 to form a first fastening groove 119. The first fastening groove 119 has a first platform 1191, a second platform 1192 and a perforation 1193 along the rear-to-front direction. An inner surface of the first fastening groove 119 is defined as the first platform 1191. A front of the first platform 1191 is recessed inward to form the second platform 1192. A front of the second platform 1192 defines the perforation 1193. A front of the inner wall of the sliding groove 118 defines the perforation 1193 penetrating through the inner wall of the sliding groove 118 in a radial direction of the protective tube 11. The first platform 1191 is close to the opening 117. The perforation 1193 is close to the front wall 114. The sliding groove 118 and the guiding groove 113 are communicated through the perforation 1193. The perforation 1193 is communicated with a rear end of the guiding groove 113. The perforation 1193 is communicated with a front end of the guiding groove 113. The second platform 1192 is disposed between the first platform 1191 and the perforation 1193. The inner wall of the sliding groove 118 is closer to the first platform 1191 than to the second platform 1192. The first platform 1191 is close to the outer surface of the protective tube 11 of the electrical connector 10. The second platform 1192 is close to the inner surface of the protective tube 11 of the electrical connector 10. A rear of the inner wall of the sliding groove 118 has a step 102. A first step 103 is formed between the first platform 1191 and the second platform 1192. A second step 104 is formed between the first platform 1191 and the outer surface of the protective tube 11. The step 102 includes the first step 103 and the second step 104.

When the electrical connector 10 and the docking connector 20 are in the first locking status, the corresponding portion of the locking structure 30 abuts against the first platform 1191, a corresponding section of the locking structure 30 abuts against the second platform 1192. When the locking structure 30 is moved to proceed with the second locking status of the electrical connector 10 and the docking connector 20, the corresponding portion of the locking structure 30 abuts against the first platform 1191. The corresponding section of the locking structure 30 moves to the perforation 1193. The corresponding section of the locking structure 30 moves to the one guiding groove 113 and abuts against a corresponding area of docking connector 20 in the guiding groove 113 for ensuring that the electrical connector 10 and the docking connector 20 without being loosened by the vibration.

Referring to FIG. 6 to FIG. 11, the first shell 12 of the electrical connector 10 has an outer wall 121, a location portion 122 and a first thread 123. The two first waterproof rings 51 are disposed to a front end and a rear end of the outer wall 121. A front end of the outer wall 121 extends frontward to form the location portion 122. An outer surface of the location portion 122 has a plurality of location blocks 1221. The plurality of the location blocks 1221 are located to corresponding mechanisms of the second shell 21 of the docking connector 20, so that the electrical connector 10 is located to the docking connector 20, and the electrical connector 10 is fastened to the docking connector 20. A rear end of the outer wall 121 extends rearward to form the first thread 123. The first cover 415 of the first main module 41 of the electrical connector 10 is disposed around a position of the first thread 123. The first cover 415 of the first main module 41 of the electrical connector 10 is engaged with the first thread 123.

Referring to FIG. 6 to FIG. 14, each first terminal 13 of the electrical connector 10 has a base body 131 and a sleeve 132. The base body 131 has a first fastening portion 1311, a first contact portion 1312 and a first connecting portion 1313. The first main portion 411 of the first main module 41 of the electrical connector 10 surrounds the first fastening portion 1311 of the base body 131 of each first terminal 13. A front end of the first fastening portion 1311 extends frontward to form the first contact portion 1312. The first contact portion 1312 is a hollow column shape. The first contact portion 1312 shrinks inward from a rear to a front of the first contact portion 1312. The sleeve 132 surrounds an outer surface of the first contact portion 1312. The first contact portion 1312 has a location hole 1314. In the preferred embodiment, the first contact portion 1312 has two location holes 1314. The sleeve 132 has a locking hook 1321. The locking hook 1321 is punched inward from one side of the sleeve 132.

In the preferred embodiment, the sleeve 132 has two locking hooks 1321. Each locking hook 1321 is bent inward from the one side of the sleeve 132. The locking hook 1321 of the sleeve 132 is buckled to the location hole 1314 of the first contact portion 1312, so that the base body 131 is located to the sleeve 132, and the base body 131 is fixed to the sleeve 132. The two locking hooks 1321 are buckled to the two location holes 1314. A rear end of the first fastening portion 1311 extends rearward to form the first connecting portion 1313. The first connecting portion 1313 is a V shape. The first connecting portion 1313 of each first terminal 13 is used for fastening one cable 60. The stopping plate 44 of the first stopping portion 412 of the electrical connector 10 is buckled with the rear end of the first fastening portion 1311 to prevent each first terminal 13 breaking away from the first main module 41.

Referring to FIG. 1 to FIG. 15, the second shell 21 of the docking connector 20 has a protrusion 211, preferably, the second shell 21 of the docking connector 20 has a plurality of protrusions 211, a plurality of second fastening grooves 212 and a second thread 213. The protrusion 211 is inserted in the guiding groove 113. Several portions of an outer surface of the second shell 21 of the docking connector 20 protrude outward to form the plurality of the protrusions 211. In the preferred embodiment, the second shell 21 of the docking connector 20 has three protrusions 211. The three protrusions 211 are evenly distributed around the outer surface of the second shell 21 of the docking connector 20. A quantity of the plurality of the protrusions 211 of the docking connector 20 is equal to a quantity of the plurality of the guiding grooves 113 of the electrical connector 10. The plurality of the protrusions 211 of the docking connector 20 are inserted in the plurality of the guiding grooves 113 of the electrical connector 10. A front of an inner surface of the locking structure 30 protrudes towards the first shell 12 to form a location foot 331. A rear of the inner surface of the locking structure 30 protrudes downward, then slantwise extends rearward and downward, and further extends rearward to form an abutting portion 333. When the protective tube 11 of the electrical connector 10 is rotated, the protrusion 211 slides along the guiding groove 113, the protrusion 211 slides from a front end of the guiding groove 113 to a rear end of the guiding groove 113, specifically, each protrusion 211 slides along the one guiding groove 113, a position of each protrusion 211 moves from the front end of the one guiding groove 113 to the rear end of the one guiding groove 113, so the electrical connector 10 is locked with the docking connector 20 for a first time, and the electrical connector assembly 100 is in the first locking status, the locking structure 30 is located at the first position 90, the abutting portion 333 abuts against the step 102, the location foot 331 faces the inner wall of the sliding groove 118.

Referring to FIG. 3 to FIG. 15, several portions of an inner surface of the second shell 21 are recessed inward to form the plurality of the second fastening grooves 212. A quantity of the plurality of the second fastening grooves 212 is equal to a quantity of the plurality of the location blocks 1221. The plurality of the second fastening grooves 212 are buckled with the plurality of the location blocks 1221 of the first shell 12 of the electrical connector 10, so that the electrical connector 10 is located to the docking connector 20, and the electrical connector 10 is fixed to the docking connector 20. In the preferred embodiment, a quantity of the plurality of the second fastening grooves 212 of the docking connector 20 is corresponding to a quantity of the plurality of the location blocks 1221 of the first shell 12 of the electrical connector 10. An outer periphery of the rear end of the second shell 21 has the second thread 213. The second cover 425 of the second main module 42 of the docking connector 20 is disposed around the second thread 213. The second cover 425 of the second main module 42 of the docking connector 20 is engaged with the second thread 213.

Referring to FIG. 2 to FIG. 16, each second terminal 22 has a second fastening portion 221, a second contact portion 222 and a second connecting portion 223. The second main portion 421 of the second main module 42 of the docking connector 20 surrounds the second fastening portion 221. A middle of a rear end of the second fastening portion 221 extends rearward to form the second contact portion 222. A part of the second contact portion 222 of each second terminal 22 is inserted into the first contact portion 1312 and the sleeve 132 of one first terminal 13 of the electrical connector 10. The part of the second contact portion 222 of each second terminal 22 is clamped by the first contact portion 1312 of the one first terminal 13, and the part of the second contact portion 222 of each second terminal 22 is connected with the first contact portion 1312 of the one first terminal 13. A middle of a front end of the second fastening portion 221 extends frontward to form the second connecting portion 223. The second connecting portions 223 of the plurality of the second terminals 22 are used for fastening the plurality of the cables 60. The stopping plates 44 of the second stopping portions 422 of the docking connector 20 are buckled with the front ends of the second fastening portions 221 of the plurality of the second terminals 22 to prevent the plurality of the second terminals 22 being receded from the second main module 42.

Referring to FIG. 5 to FIG. 20, the locking structure 30 is disposed to the mounting portion 112 of the electrical connector 10, and the locking structure 30 is received in the sliding groove 118 of the electrical connector 10. The locking structure 30 has a main body 31, an upper portion 32 and a lower portion 33. The main body 31 is disposed between the two blocking walls 116 of the mounting portion 112. The main body 31 extends upward and expands outward to form the upper portion 32. Two sides of the upper portion 32 are disposed to two outer surfaces of the two blocking walls 116 of the mounting portion 112. The main body 31 extends downward and expands outward to form the lower portion 33. The lower portion 33 is disposed in the sliding groove 118 of the mounting portion 112 of the electrical connector 10. The lower portion 33 is disposed between the two side walls 115 of the mounting portion 112.

In the preferred embodiment, a width of the upper portion 32 is wider than a width of a rear end of the lower portion 33. A width of a front end of the lower portion 33 is narrower than the width of the rear end of the lower portion 33. The width of the rear end of the lower portion 33 is wider than a width of the main body 31.

Two opposite sides of the main body 31 of the locking structure 30 protrude oppositely to form two convex surfaces 311. The two convex surfaces 311 are used for interfering with the two convex portions 1163 of the two blocking walls 116, so that the locking structure 30 is fastened in the mounting portion 112.

Referring to FIG. 5 to FIG. 20, A front end of an inner surface of the lower portion 33 of the locking structure 30 extends towards the first shell 12 to form the location foot 331. When the locking structure 30 is moved from the first position 90 to the second position 91, a front surface of the locking structure 30 abuts against the front wall 114 of the mounting portion 112. The location foot 331 of the locking structure 30 penetrates through the perforation 1193 of the mounting portion 112 and abuts against one protrusion 211 of the docking connector 20 to make sure that the electrical connector 10 and the docking connector 20 are without getting loose due to the vibration. When the protrusion 211 is located at the rear end of the guiding groove 113, the locking structure 30 moves to the second position 91, the protrusion 211 penetrates through the perforation 1193, and the protrusion 211 moves into the guiding groove 113, and the protrusion 211 is blocked between the front end of the guiding groove 113 and the rear end of the guiding groove 113. When the one protrusion 211 of the docking connector 20 is located at the rear end of the one guiding groove 113 of the electrical connector 10, the location foot 331 penetrates through the perforation 1193 and is moved to the one guiding groove 113, and the location foot 331 is blocked between the front end of the one guiding groove 113 and the rear end of the one guiding groove 113 to prevent the one protrusion 211 breaking out of the one guiding groove 113 from the front end of the one guiding groove 113 by the vibration. The convex surfaces 311 of the locking structure 30 slide across the two convex portions 1163 of the mounting portion 112. The two convex surfaces 311 of the locking structure 30 are fastened among the two first blocks 1161 and the two convex portions 1163. Thus, the locking structure 30 is uneasy to be receded from the second position 91, the locking structure 30 keeps in the second position 91, so that a connection relationship between the electrical connector 10 and the docking connector 20 is reinforced.

Rear ends of two opposite sides of the lower portion 33 of the locking structure 30 extend towards the two side walls 115 of the mounting portion 112 to form two extending portions 332. The two extending portions 332 guide the locking structure 30 in the sliding groove 118 of the mounting portion 112 of the electrical connector 10 to prevent the locking structure 30 moving upward to break away from the mounting portion 112 of the electrical connector 10. In the preferred embodiment, a width of each extending portion 332 is wider than a width of each convex surface 311. Two positions of the two extending portions 332 are close to the opening 117 of the mounting portion 112.

The lower portion 33 is the U shape. A mouth of the lower portion 33 faces rearward. A rear end of a bottom surface of the main body 31 protrudes downward, then slantwise extends rearward and downward, and further extends rearward to form the abutting portion 333. The abutting portion 333 is formed among a rear end of the lower portion 33. The locking structure 30 is inserted to the mounting portion 112 from the opening 117. When the locking structure 30 is inserted to the mounting portion 112 from the opening 117, a tail end of the abutting portion 333 abuts against a rear end of the first platform 1191 to prevent the locking structure 30 moving rearward to break away from the mounting portion 112 of the electrical connector 10. When the locking structure 30 is located at the first position 90, the abutting portion 333 abuts against the rear end of the first platform 1191 of the mounting portion 112, the location foot 331 abuts against the second platform 1192 of the mounting portion 112. When the locking structure 30 is located at the first position 90, the abutting portion 333 abuts against the second step 104 of the mounting portion 112. When the locking structure 30 moves from the first position to the second position 91, the abutting portion 333 abuts against a front end of the first platform 1191 of the mounting portion 112, the location foot 331 moves away from the second platform 1192, the abutting portion 333 is separated from the step 102, the location foot 331 moves to the perforation 1193, and the location foot 331 abuts against the protrusion 211 of the docking connector 20, so the electrical connector 10 is locked with the docking connector 20 for a second time, the electrical connector assembly 100 is in the second locking status, and the electrical connector 10 and the docking connector 20 are without getting loose by the vibration.

In the concrete implementation, each guiding groove 113 is defined as the inclined groove. The guiding groove 113 is any shape. The one guiding groove 113 is changed into any shape which is cooperated with the location foot 331 to act as a guiding function.

As described above, the protective tube 11 of the electrical connector 10 is rotated, so that the electrical connector 10 is locked with the docking connector 20 for the first time, and the electrical connector assembly 100 is in the first locking status. The locking structure 30 is pushed from the first position 90 to the second position 91 so as to make that the electrical connector 10 is locked with the docking connector 20 for the second time, and the electrical connector assembly 100 is in the second locking status, the protective tube 11 is prevented from making that the electrical connector 10 and the docking connector 20 get loose due to the vibration, on the contrary, the locking structure 30 is pushed from the second position 91 back to the first position 90, the protective tube 11 is reversely rotated to make the electrical connector 10 separated from the docking connector 20. Thus, the electrical connector assembly 100 has a double locking structure and a double locking function, the electrical connector assembly 100 is uneasy to get loose due to the vibration, the guiding groove 113 is changed into any shape which is cooperated with the location foot 331 to act as the guiding function. An actuating stroke of the locking structure 30 is without being limited to a longitudinal reciprocating movement along the docking direction of the electrical connector assembly 100, the locking structure 30 is cooperated with a shape design of the guiding groove 113 to reciprocally move along a transverse direction which is orthogonal to the docking direction of the electrical connector assembly 100, or the locking structure 30 moves along an inclining direction with respect to the docking direction of the electrical connector assembly 100. When the locking structure 30 moves to the first position 90, the docking connector 20 is receded, when the locking structure 30 moves to the second position 91, the protrusion 211 of the docking connector 20 is blocked in a moving path of the guiding groove 113, and the moving path of the guiding groove 113 is replaceable. As a result, the electrical connector assembly 100 is ensured to uneasily get loose under the vibration.

What is claimed is:

1. An electrical connector assembly, comprising:

an electrical connector, including:

a first main module;

a plurality of first terminals fastened in the first main module;

a first shell mounted around an outer surface of the first main module; and a protective tube mounted around an outer surface of the first shell, an outer surface of the protective tube protruding outward to form a mounting portion, one end of the mounting portion being defined as a first position, and the other end of the mounting portion being defined as a second position, an inner surface of the protective tube having a guiding groove, the mounting portion defining a sliding groove penetrating through a rear surface of the mounting portion, an inner wall of the sliding groove defining a perforation penetrating through the inner wall of the sliding groove in a radial direction of the protective tube, the sliding groove and the guiding groove being communicated through the perforation;

a locking structure disposed to the mounting portion, an inner surface of the locking structure protruding towards the first shell to form a location foot; and a docking connector docked with the electrical connector, the docking connector including:

a second main module;

a plurality of second terminals fastened in the second main module; and a second shell mounted around an outer surface of the second main module, the second shell having a protrusion, the protrusion being inserted in the guiding groove;

wherein when the protective tube is rotated, the protrusion slides along the guiding groove, the protrusion slides from a front end of the guiding groove to a rear end of the guiding groove;

wherein when the protrusion is located at the front end of the guiding groove, the locking structure is located at the first position, the location foot of the locking structure is disposed in the sliding groove of the protective tube; and wherein when the protrusion is located at the rear end of the guiding groove, the locking structure moves to the second position, the protrusion penetrates through the perforation, and the protrusion moves into the guiding groove, and the protrusion is blocked between the front end of the guiding groove and the rear end of the guiding groove.

2. The electrical connector assembly as claimed in claim 1, wherein the mounting portion is a U shape, the mounting portion has a front wall, two side walls, two blocking walls and an opening, the sliding groove is formed among the front wall, the two side walls and the two blocking walls, the front wall is disposed to a front end of the sliding groove, the two side walls are disposed to two opposite sides of the sliding groove, the two blocking walls are disposed to an outside of the sliding groove, the opening is communicated with a rear end of the sliding groove.

3. The electrical connector assembly as claimed in claim 2, wherein a front surface of the electrical connector and a rear surface of the docking connector are defined as docking surfaces, a front surface of the protective tube of the electrical connector extends outward and rearward to form the front wall, the front wall is disposed to the docking surface of the electrical connector, and the front wall is close to the docking connector, the two side walls extend along a docking direction of the electrical connector assembly, front ends of the two side walls are connected with the front wall, the opening is formed between rear ends of the two side walls, a position of the opening is far away from the docking connector, two facing sides of the two side walls extend towards each other to form the two blocking walls.

4. The electrical connector assembly as claimed in claim 3, wherein the locking structure has a main body, an upper portion and a lower portion, the main body is disposed between the two blocking walls of the mounting portion, the main body extends upward and expands outward to form the upper portion, two sides of the upper portion are disposed to two outer surfaces of the two blocking walls of the mounting portion, the main body extends downward and expands outward to form the lower portion, the lower portion is disposed in the sliding groove of the mounting portion, the lower portion is disposed between the two side walls of the mounting portion, a width of the upper portion is wider than a width of a rear end of the lower portion, a width of a front end of the lower portion is narrower than the width of the rear end of the lower portion, the width of the rear end of the lower portion is wider than a width of the main body.

5. The electrical connector assembly as claimed in claim 4, wherein each blocking wall has a first block, a second block and a convex portion, two opposite sides of the front wall extend rearward to form two first blocks, two outer sides of two rear ends of the two first blocks extend rearward to form two second blocks, two inner sides of two rear edges of the two first blocks slantwise extend rearward and outward, a width of each first block is wider than a width of each second block, two middles of two inner sides of the two second blocks protrude inward to form two convex portions, positions of the two convex portions are opposite to each other.

6. The electrical connector assembly as claimed in claim 5, wherein a middle of each second block has a hollow structure, the convex portion is corresponding to a middle of the hollow structure.

7. The electrical connector assembly as claimed in claim 5, wherein two opposite sides of the main body of the locking structure protrude oppositely to form two convex surfaces, the convex surfaces of the locking structure slide across the two convex portions of the mounting portion, the two convex surfaces of the locking structure are fastened among the two first blocks and the two convex portions.

8. The electrical connector assembly as claimed in claim 7, wherein a rear end of an inner wall of the sliding groove is recessed inward and towards a center of the protective tube to form a first fastening groove, the first fastening groove has a first platform, a second platform and the perforation, the first platform is close to the opening, the perforation is close to the front wall, the perforation is communicated with a rear end of the guiding groove, the second platform is disposed between the first platform and the perforation, the inner wall of the sliding groove is closer to the first platform than to the second platform, the first platform is close to the outer surface of the protective tube of the electrical connector, the second platform is close to the inner surface of the protective tube of the electrical connector.

9. The electrical connector assembly as claimed in claim 8, wherein a rear end of a bottom surface of the main body protrudes downward, then slantwise extends rearward and downward, and further extends rearward to form an abutting portion, the locking structure is inserted to the mounting portion from the opening, when the locking structure is located at the first position, the abutting portion abuts against a rear end of the first platform of the mounting portion, the location foot abuts against the second platform of the mounting portion, when the locking structure moves to the second position, the abutting portion abuts against a front end of the first platform of the mounting portion, the location foot moves away from the second platform, the location foot moves to the perforation, and the location foot abuts against the protrusion of the docking connector, rear ends of two opposite sides of the lower portion of the locking structure extend towards the two side walls of the mounting portion to form two extending portions, two positions of the two extending portions are close to the opening of the mounting portion, the two extending portions guide the locking structure in the sliding groove of the mounting portion, a width of each extending portion is wider than a width of each convex surface.

10. The electrical connector assembly as claimed in claim 1, wherein the first main module has a first main portion, a first stopping portion, a first buckling portion, a first silicone portion and a first cover along a docking direction of the electrical connector assembly, the first main portion, the first stopping portion, the first buckling portion, the first silicone portion and the first cover are arranged along a front-to-rear direction, the second main module of the docking connector is disposed opposite to the first main module of the electrical connector, the second main module of the docking connector has a second main portion, a second stopping portion, a second buckling portion, a second silicone portion and a second cover along a rear-to-front direction.

11. The electrical connector assembly as claimed in claim 10, wherein the first main portion of the first main module of the electrical connector surrounds the plurality of the first terminals of the electrical connector, the first stopping portion of the first main module the electrical connector is disposed to a rear end of the first main portion of the first main module of the electrical connector, the first buckling portion of the first main module of the electrical connector is disposed to a rear end of the first stopping portion of the first main module of the electrical connector, the first silicone portion of the first main module of the electrical connector is disposed to a rear end of the first buckling portion of the first main module of the electrical connector, the first silicone portion of the first main module of the electrical connector surrounds parts of a plurality of cables, the first cover of the first main module of the electrical connector is disposed around a rear end of the first shell of the electrical connector.

12. The electrical connector assembly as claimed in claim 10, wherein the second main portion of the second main module of the docking connector surrounds parts of the plurality of the second terminals of the docking connector, the second stopping portion of the second main module of the docking connector is disposed to a front end of the second main portion of the second main module of the docking connector, the second buckling portion of the second main module of the docking connector is disposed to a front end of the second stopping portion of the second main module of the docking connector, the second silicone portion of the second main module of the docking connector is disposed to a front end of the second buckling portion of the second main module of the docking connector, the second silicone portion of the second main module of the docking connector surrounds parts of a plurality of cables, the second cover of the second main module of the docking connector is disposed to a front end of the second shell of the docking connector.

13. The electrical connector assembly as claimed in claim 10, wherein the first stopping portion, the first buckling portion, the first silicone portion and the first cover of the first main module of the electrical connector and the second stopping portion, the second buckling portion, the second silicone portion and the second cover of the second main module of the docking connector have the same structure design.

14. The electrical connector assembly as claimed in claim 10, wherein the first stopping portion has a plurality of terminal slots penetrating through a front surface and a rear surface of the first stopping portion, the second stopping portion has the plurality of the terminal slots penetrating through a front surface and a rear surface of the second stopping portion, an inner surface of each terminal slot has a plurality of stopping plates gradually extending inward and towards the first main portion and the second main portion.

15. The electrical connector assembly as claimed in claim 10, wherein the electrical connector has two first waterproof rings, the two first waterproof rings are mounted around the outer surface of the first shell, the protective tube surrounds the two first waterproof rings, the two waterproof rings of the electrical connector are disposed between the protective tube and the first shell, the first shell of the electrical connector has an outer wall, a location portion and a first thread, the two first waterproof rings are disposed to a front end and a rear end of the outer wall, a front end of the outer wall extends frontward to form the location portion, a rear end of the outer wall extends rearward to form the first thread, the first cover of the first main module of the electrical connector is engaged with the first thread.

16. The electrical connector assembly as claimed in claim 15, wherein the docking connector has a screw and a second waterproof ring, the second shell is mounted around an outer surface of the second main module of the docking connector, a rear end of the second shell is inserted between the protective tube of the electrical connector and the first shell of the electrical connector, the screw is fastened around an outer surface of the second shell, the second main module surrounds the plurality of the second terminals, front ends of the plurality of the second terminals are connected with a plurality of cables, rear ends of the plurality of the second terminals are inserted into the plurality of the first terminals, the second waterproof ring of the docking connector is mounted around the outer surface of the second shell, the second waterproof ring of the docking connector is disposed to a rear end of the screw.

17. The electrical connector assembly as claimed in claim 10, wherein each first terminal of the electrical connector has a base body and a sleeve, the base body has a first fastening portion, a first contact portion and a first connecting portion, the first main portion of the first main module of the electrical connector surrounds the first fastening portion of the base body of each first terminal, a front end of the first fastening portion extends frontward to form the first contact portion, the first contact portion is a hollow column shape, the sleeve surrounds an outer surface of the first contact portion, the first contact portion has two location holes, the sleeve has two locking hooks, each locking hook is bent inward from one side of the sleeve, the two locking hooks are buckled to the two location holes, a rear end of the first fastening portion extends rearward to form the first connecting portion, the stopping plate of the first stopping portion of the electrical connector is buckled with the rear end of the first fastening portion.

18. The electrical connector assembly as claimed in claim 17, wherein each second terminal has a second fastening portion, a second contact portion and a second connecting portion, the second main portion of the second main module of the docking connector surrounds the second fastening portion, a rear end of the second fastening portion extends rearward to form the second contact portion, a part of the second contact portion of each second terminal is insert into the first contact portion and the sleeve of one first terminal of the electrical connector, a part of the second contact portion of each second terminal is clamped by the first contact portion of the one first terminal, and the part of the second contact portion of each second terminal is connected with the first contact portion of the one first terminal, a front end of the second fastening portion extends frontward to form the second connecting portion, the stopping plates of the second stopping portions of the docking connector are buckled with the front ends of the second fastening portions of the plurality of the second terminals.

19. An electrical connector assembly, comprising:

an electrical connector, including:

a first main module;

a plurality of first terminals fastened in the first main module;

a first shell mounted around an outer surface of the first main module; and a protective tube mounted around an outer surface of the first shell, an outer surface of the protective tube protruding outward to form a mounting portion, one end of the mounting portion being defined as a first position, and the other end of the mounting portion being defined as a second position, an inner surface of the protective tube having a guiding groove, the mounting portion defining a sliding groove penetrating through a rear surface of the mounting portion, a front of an inner wall of the sliding groove defining a perforation penetrating through the inner wall of the sliding groove in a radial direction of the protective tube, a rear of the inner wall of the sliding groove having a step, the sliding groove and the guiding groove being communicated through the perforation;

a locking structure disposed to the mounting portion, a front of an inner surface of the locking structure protruding towards the first shell to form a location foot, a rear of the inner surface of the locking structure protruding downward, then slantwise extending rearward and downward, and further extending rearward to form an abutting portion; and a docking connector docked with the electrical connector, the docking connector including:

a second main module;

a plurality of second terminals fastened in the second main module; and a second shell mounted around an outer surface of the second main module, the second shell having a protrusion, the protrusion being inserted in the guiding groove;

wherein when the protective tube of the electrical connector is rotated, the protrusion slides along the guiding groove, the protrusion slides from a front end of the guiding groove to a rear end of the guiding groove, so the electrical connector is locked with the docking connector for a first time, the electrical connector assembly is in a first locking status, the locking structure is located at the first position, the abutting portion abuts against the step, the location foot faces the inner wall of the sliding groove; and wherein when the locking structure moves from the first position to the second position, the abutting portion is separated from the step, the location foot moves to the perforation, and the location foot abuts against the protrusion of the docking connector, so the electrical connector is locked with the docking connector for a second time.

20. An electrical connector assembly, comprising:

an electrical connector, including:

a first main module;

a plurality of first terminals fastened in the first main module;

a first shell mounted around an outer surface of the first main module; and a protective tube mounted around an outer surface of the first shell, an outer surface of the protective tube protruding outward to form a mounting portion, one end of the mounting portion being defined as a first position, and the other end of the mounting portion being defined as a second position, an inner surface of the protective tube having a guiding groove, the mounting portion defining a sliding groove penetrating through a rear surface of the mounting portion, a rear end of an inner wall of the sliding groove being recessed inward and towards a center of the protective tube to form a first fastening groove, the first fastening groove having a first platform, a second platform and a perforation along a rear-to-front direction, an inner surface of the first fastening groove being defined as the first platform, a front of the first platform being recessed inward to form the second platform, a front of the second platform defining the perforation penetrating through the inner wall of the sliding groove in a radial direction of the protective tube, the sliding groove and the guiding groove being communicated through the perforation;

a locking structure disposed to the mounting portion, the locking structure having a main body, the main body extending downward and expanding outward to form a lower portion, the lower portion being disposed in the sliding groove, a front end of an inner surface of the lower portion extending towards the first shell to form a location foot, a rear end of a bottom surface of the main body protruding downward, then slantwise extending rearward and downward, and further extending rearward to form an abutting portion; and a docking connector docked with the electrical connector, the docking connector including:

a second main module;

a plurality of second terminals fastened in the second main module; and a second shell mounted around an outer surface of the second main module, the second shell having a protrusion, the protrusion being inserted in the guiding groove;

wherein when the protective tube of the electrical connector is rotated, the protrusion slides along the guiding groove, the protrusion slides from a front end of the guiding groove to a rear end of the guiding groove, so the electrical connector is locked with the docking connector for a first time, the electrical connector assembly is in a first locking status, the locking structure is located at the first position;

wherein when the locking structure is located at the first position, the abutting portion abuts against a rear end of the first platform of the mounting portion, the location foot abuts against the second platform of the mounting portion; and wherein when the locking structure moves from the first position to the second position, the abutting portion abuts against a front end of the first platform of the mounting portion, the location foot moves away from the second platform, the location foot moves to the perforation, and the location foot abuts against the protrusion of the docking connector, so the electrical connector is locked with the docking connector for a second time, the electrical connector assembly is in a second locking status.

* * * * *